United States Patent
Akishita et al.

(10) Patent No.: US 7,835,517 B2
(45) Date of Patent: Nov. 16, 2010

(54) ENCRYPTION PROCESSING APPARATUS, ENCRYPTION PROCESSING METHOD, AND COMPUTER PROGRAM

(75) Inventors: Toru Akishita, Tokyo (JP); Masanobu Katagi, Kanagawa (JP)

(73) Assignee: Sony Corporation (JP)

(*) Notice: Subject to any disclaimer, the term of this patent is extended or adjusted under 35 U.S.C. 154(b) by 960 days.

(21) Appl. No.: 11/653,182

(22) Filed: Jan. 12, 2007

(65) Prior Publication Data

US 2007/0211894 A1   Sep. 13, 2007

(30) Foreign Application Priority Data

Jan. 16, 2006   (JP) .......................... P2006-007105

(51) Int. Cl.
*H04L 9/28* (2006.01)

(52) U.S. Cl. .............................. 380/30; 380/28; 380/29

(58) Field of Classification Search ........................ None
See application file for complete search history.

(56) References Cited

U.S. PATENT DOCUMENTS

| 7,177,422 | B2* | 2/2007 | Akishita | 380/28 |
|---|---|---|---|---|
| 7,536,011 | B2* | 5/2009 | Takenaka et al. | 380/28 |
| 7,555,122 | B2* | 6/2009 | Moller et al. | 380/30 |
| 7,602,907 | B2* | 10/2009 | Zhu et al. | 380/30 |
| 7,697,683 | B2* | 4/2010 | Katagi et al. | 380/30 |
| 2004/0215684 | A1* | 10/2004 | Joye et al. | 708/490 |
| 2005/0201553 | A1* | 9/2005 | Katagi et al. | 380/28 |
| 2007/0064931 | A1* | 3/2007 | Zhu et al. | 380/30 |
| 2007/0291937 | A1* | 12/2007 | Katagi et al. | 380/30 |
| 2009/0052657 | A1* | 2/2009 | Golic | 380/28 |

(Continued)

FOREIGN PATENT DOCUMENTS

EP   1296224 A1 * 3/2003

(Continued)

OTHER PUBLICATIONS

Okeya, K. and Takagi, T., "The Width-w NAF Method Provides Small Memory and Fast Elliptic Scalar Multiplications Secure against Side Channel Attacks", CT-RSA 2003, LNCS 2612, Springer-Verlag Berlin Heidelberg, pp. 328-343, 2003.*

(Continued)

*Primary Examiner*—Edan Orgad
*Assistant Examiner*—Alexander Lagor
(74) *Attorney, Agent, or Firm*—Lerner, David, Littenberg, Krumholz & Mentlik, LLP

(57) ABSTRACT

An encryption processing apparatus for performing a scalar multiplication of $kP+lQ$ based on two points P and Q on an elliptic curve and scalar values k and l or a scalar multiplication of $kD_1+lD_2$ based on divisors $D_1$ and $D_2$ and scalar values k and l may include a scalar value controller configured to generate joint regular form of $(k, l)$, $k=<k_n, \ldots k_0>$ and $l=<l_n, \ldots l_0>$, which are set so that all the bits of the scalar values k and l are represented by 0, +1, or −1, and the combination $(k_i, l_i)$ of bits at positions corresponding to the scalar values k and l is set to satisfy $(k_i, l_i)=(0, \pm 1)$ or $(\pm 1, 0)$; and a computation execution section configured to perform a process for computing a scalar multiplication of $kP+lQ$ or $kD_1+lD_2$.

9 Claims, 7 Drawing Sheets

U.S. PATENT DOCUMENTS

2009/0214025 A1* 8/2009 Golic .................... 380/28

FOREIGN PATENT DOCUMENTS

| | | | |
|---|---|---|---|
| EP | 1331552 A2 | * | 7/2003 |
| JP | 2002323852 A | * | 11/2002 |
| WO | WO 2004038680 A1 | * | 5/2004 |

OTHER PUBLICATIONS

Katti, R., "Speeding up elliptic cryptosystems using a new signed binary representation for integers," Digital System Design, 2002. Proceedings. Euromicro Symposium on , vol., no., pp. 380-384, 2002.*

Solinas, J.A., "Low-Weight Binary Representations for Pairs of Integers", Technical Report, CORR 2001-41, Center for Applied Cryptographic Research, University of Waterloo, Canada, 2001.*

M K Lee: "SPA-Resistant Simultaneous Scalar Multiplication" Computation Science and Its Applications ICCSA 2005, vol. 3481/ 2005, May 2, 2005, pp. 314-321.*

T Akishita: "Fast Simultaneous Scalar Multiplication on Elliptic Curve with Montgomery Form" Selected Areas in Cryptography: 8th Annual International Workshop, SAC 2001 Toronto, Ontario, Canada, Aug. 16-17, 2001 .Revised Papers, vol. 2259/2001, Feb. 19, 2004, pp. 255-267.*

D. Hankerson, J.L. Hernandez, and A. Menezes, "Software Implementation of Elliptic Curve Cryptography over Binary Fields", Cryptographic Hardware and Embedded Systems—CHES 2000, LNCS 1965, pp. 1-24, Springer-Verlag, 2000.

J.-S. Coron, "Resistance against Differential Power Analysis for Elliptic Curve Cryptosystems", Cryptographic Hardware and Embedded System-CHES'99, LNCS 1965, pp. 292-302, Springer-Verlag, 1999.

Toru Akishita et al: "SPA-Resistant Scalar Multiplication on Hyperelliptic Curve Cryptosystems Combining Divisor Decomposition Technique and Joint Regular Form" Cryptographic Hardware and Embedded Systems—CHES 2006 Lecture Notes in Computer Science;;LNCS, Springer Berlin Heidelberg, BE, vol. 4249, 2006, pp. 148-159.

Xiaoyu Ruan et al., On the Signed-Binary Window Method, IEEE International Symposium on Circuits and Systems 2005, [ on Line ], 2005 p. 1-4 [retrieved on May 13, 2010], retrieved from the Internet: <URL, http://citeseerx.ist.psu.edu/viewdoc/summary?doi=10.1.1. 135.9464>.

Office Action from Japanese Application No. 2006-007105, dated May 18, 2010.

* cited by examiner

FIG. 2

| | | | |
|---|---|---|---|
| (1) | $(k_i, l_i) = (1, 0)$ | | $(k_i, l_i)$ IS USED AS IS AS JRF REPRESENTATION WITHOUT CHANGE |
| (2) | $(k_i, l_i) = (0, 1)$ | | |
| (3) | $(k_i, l_i) = (0, 0)$ | (3a) $(k_{i-1}, l_{i-1}) = (1, 0)$ | $(k_i, k_{i-1}) = [0, 1] \rightarrow JRF\langle 1, -1\rangle$ |
| | | | $(l_i, l_{i-1}) = [0, 0] \rightarrow JRF\langle 0, 0\rangle$ |
| | | (3b) $(k_{i-1}, l_{i-1}) = (0, 1)$ | $(k_i, k_{i-1}) = [0, 0] \rightarrow JRF\langle 0, 0\rangle$ |
| | | | $(l_i, l_{i-1}) = [0, 1] \rightarrow JRF\langle 1, -1\rangle$ |
| (4) | $(k_i, l_i) = (1, 1)$ | (4a) $(k_{i-1}, l_{i-1}) = (1, 0)$ | $(k_i, k_{i-1}) = [1, 1] \rightarrow JRF\langle 0, -1\rangle$ AND CARRY OVER [+1] TO $k_{i+1}$ |
| | | | $(l_i, l_{i-1}) = [1, 0] \rightarrow JRF\langle 1, 0\rangle$ |
| | | (4b) $(k_{i-1}, l_{i-1}) = (0, 1)$ | $(k_i, k_{i-1}) = [1, 0] \rightarrow JRF\langle 1, 0\rangle$ |
| | | | $(l_i, l_{i-1}) = [1, 1] \rightarrow JRF\langle 0, -1\rangle$ AND CARRY OVER [+1] TO $l_{i+1}$ |

ENCRYPTION PROCESSING APPARATUS, ENCRYPTION PROCESSING METHOD, AND COMPUTER PROGRAM

CROSS-REFERENCE TO RELATED APPLICATIONS

This application claims priority from Japanese Patent Application No. JP 2006-007105 filed in the Japanese Patent Office on Jan. 16, 2006, the entire content of which is incorporated herein by reference.

BACKGROUND OF THE INVENTION

1. Field of the Invention

The present invention relates to an encryption processing apparatus, an encryption processing method, and a computer program. More particularly, the present invention relates to an encryption processing apparatus for realizing high-speed computation of the scalar double-and-add point $kP+lQ$ in elliptic curve cryptography and the scalar double-and-add divisor $kD_1+lD_2$ in hyperelliptic curve cryptography, an encryption processing method for use therewith, and a computer program for use therewith.

2. Description of the Related Art

As network communication and electronic commerce have progressed in recent years, ensuring security in communication has become an important issue. An example of a security ensuring method is encryption technology. At present, communication using various encryption techniques has been performed.

A system has been put into practical use in which, for example, an encryption processing module is embedded in a small device, such as an IC card, data transmission/reception is performed between the IC card and a reader/writer serving as a data reading/writing device, and an authentication process or encryption and decryption of transmission/reception data are performed.

For example, IC cards with which an encryption process is performed have come to be increasingly used in various gates such as ticket gates of stations or in shopping centers. There has been a stringent demand for miniaturization and high processing speed.

Encryption is broadly classified into a common key encryption method and a public key encryption method. The common key encryption method is also called a symmetrical encryption method, and both a transmitting party and a receiving party possess a common key. Examples of the common key encryption method include that according to DES (Data Encryption Standard). Features of the DES algorithm are that encryption and decryption can be performed by almost the same algorithm.

In contrast with the common key encryption method, the configuration in which the key of the transmitting party is made different from the key of the receiving party is a public key encryption method or an asymmetrical encryption method. In the public key encryption method, unlike the common key encryption method in which a common key is used for encryption and decryption, a secret key should only be possessed by one person, and therefore, this is advantageous in the management of keys. However, the data processing speed of the public key encryption method is slower than that of the common key encryption method, and in general, the public key encryption method is often used for objects with a small amount of data, such as delivery of a secret key and a digital signature. As examples of public key encryption methods, RSA (Rivest-Shamir-Adleman) cryptography and elliptic curve cryptography (ECC) are known.

Elliptic curve cryptography is cryptography using the difficulty of solving a discrete logarithm problem on an elliptic curve, and is said to have security equivalent to that of 1024-bit RSA encryption at 160 bits. In general, in elliptic curve cryptography, an elliptic curve: $y^2 = x^3 + ax + b (4a^3 + 27b^2 \neq 0)$ on a prime field, an elliptic curve: $y^2 + xy = x^3 + ax^2 + b (b \neq 0)$ on an extension field of two, and the like are used. A set in which a point at infinity (O) is added to points on these curves forms a finite group with regard to the addition, and the point at infinity (O) forms the unity thereof. Hereinafter, the addition of points in the finite group is denoted by +.

This addition $P+Q$ of two different points P and Q in the finite group is referred to as "point addition", and the addition $P+P=2P$ of a point P and a point P is referred to as "point doubling".

Furthermore, computation for determining a point $P+P+\ldots+P=kP$ in which a point P is added k times is referred to as "scalar point multiplication". Computation in elliptic curve cryptography is described in, for example, D. Hankerson, J. L. Hernandez, and A. Menezes, "Software Implementation of Elliptic Curve Cryptography over Binary Fields", Cryptographic Hardware and Embedded Systems—CHES 2000, LNCS 1965, pp. 1-24, Springer-Verlag, 2000.

Furthermore, a "simultaneous scalar point multiplication algorithm" for computing the scalar double-and-add point $kP+lQ$ of two different points P and Q on an elliptic curve at a high speed is known. k and l are each given by a scalar quantity. The simultaneous scalar point multiplication algorithm is performed by using an algorithm with each of the scalar values k and l being expressed in a binary representation as $k = (k_n \ldots k_0)_2$ and $l = (l_n \ldots l_0)_2$.

"Simultaneous Scalar Point Multiplication Algorithm"
Input: Points P and Q on an elliptic curve
Scalar values k and l
Output: $kP+lQ$
1. Compute $P+Q$
2. $T \leftarrow (k_n P + l_n Q)$
3. For $i = n-1$ downto 0 do
   $T \leftarrow 2T$
   If $(k_i, l_i) \neq (0, 0)$ then
   $T \leftarrow T + (k_i P + l_i Q)$
4. Return T The "simultaneous scalar point multiplication algorithm" is a technique in which kP and lQ as individual scalar multiplications of each of points P and Q are not computed separately, but $kP+lQ$ is simultaneously computed on the basis of the conditions of corresponding bits $(k_i, l_i)$ of the binary representation scalar quantity. In this technique, the number of times point doubling is performed can be reduced to approximately half that of the case in which scalar multiplication of kP or lQ of each point P or Q is computed and thereafter $kP+lQ$ is performed as a point addition process, thereby realizing higher speed.

While encryption utilizing the difficulty of solving a discrete logarithm problem on an elliptic curve exists, an attack method called power analysis attack that reveals secret information stored in a device by measuring the power consumption of the device in the middle of an elliptic curve cryptography process has been proposed. Power analysis attack includes mainly simple power analysis (SPA) using one power consumption waveform and differential power analysis (DPA) using differences between power consumption waveforms. A power analysis attack on elliptic curve cryptography is described in, for example, J. -S. Coron, "Resistance against Differential Power Analysis for Elliptic Curve Cryptosystems", Cryptographic Hardware and Embedded System-CHES'99, LNCS 1965, pp. 292-302, Springer-Verlag, 1999. In general, countermeasures against DPA in elliptic curve cryptography are realized by combining a randomizing technique with countermeasures against SPA.

However, the "simultaneous scalar point multiplication algorithm" is not safe for SPA. Since computations of point doubling and point addition are performed as different processes, features of power consumption in the middle of computation differ. Therefore, it is possible for an attacker to distinguish whether point doubling is being performed or point addition is being performed by viewing a power consumption waveform.

In step 3 in the above "simultaneous scalar point multiplication algorithm", whereas point doubling of T←2T is performed on all i, point addition of T←T+($k_i$P+$l_i$Q) is performed only when ($k_i$, $l_i$)≠(0, 0). Therefore, it is possible for the attacker to distinguish whether ($k_i$, $l_i$)=(0, 0) by viewing a power consumption waveform. In the above "simultaneous scalar point multiplication algorithm", pre-computation of performing point addition of P+Q in step 1 is necessary.

SUMMARY OF THE INVENTION

It is desirable to provide an encryption processing apparatus for realizing high-speed computation of the scalar double-and-add point kP+lQ in elliptic curve cryptography and the scalar double-and-add divisor $kD_1$+$lD_2$ in hyperelliptic curve cryptography, which is a method in which elliptic curve cryptography is generalized, and for realizing computation of the scalar double-and-add point having resistance against attacks, such as simple power analysis (SPA), an encryption processing method for use therewith, and a computer program for use therewith.

According to an embodiment of the present invention, there is provided an encryption processing apparatus for performing one of a scalar multiplication of kP+lQ based on two points P and Q on an elliptic curve defined by elliptic curve cryptography and scalar values k and l, and a scalar multiplication of $kD_1$+$lD_2$ based on divisors $D_1$ and $D_2$ defined by hyperelliptic curve cryptography and scalar values k and l, the encryption processing apparatus including:

a scalar value controller configured to generate joint regular form of (k, l)

k=<$k_n$, ... $k_0$> and l=<$l_n$, ... $l_0$>, which are set so that all the bits of the scalar values k and l are represented by 0, +1, or −1, and the combination ($k_i$, $l_i$) of bits at positions corresponding to the scalar values k and l is set to satisfy ($k_i$, $l_i$)=(0, ±1) or (±1, 0); and a computation execution section configured to perform a scalar multiplication of kP+lQ or $kD_1$+$lD_2$ with the joint regular form of (k, l) generated by the scalar value controller.

In an embodiment of the encryption processing apparatus of the present invention, when both the scalar values k and l are even or odd, the scalar value controller may change one of the scalar values so as to be set to a combination of an even number and an odd number, and may generate joint regular form of (k, l)

k=<$k_n$, ... $k_0$> and l=<$l_n$, ... $l_0$> in which the combination ($k_i$, $l_i$) of bits at positions corresponding to the changed scalar values k and l satisfies ($k_i$, $l_i$)=(0, ±1) or (±1, 0), and the computation execution section may perform a scalar multiplication of kP+lQ or $kD_1$+$lD_2$ on the basis of the changed scalar values, performs a correction computation, and computes scalar double-and-add results by applying the scalar values before being changed.

In an embodiment of the encryption processing apparatus of the present invention, the computation execution section may select corresponding bits ($k_i$, $l_i$) of the joint regular form of (k, l), k=<$k_n$, ... $k_0$> and l=<$l_n$, ... $l_0$>, and may perform a computation process to which a simultaneous computation technique of simultaneously computing a scalar multiplication of kP+lQ or $kD_1$+$lD_2$ is applied.

In an embodiment of the encryption processing apparatus of the present invention, the computation execution section may perform a computation process to which the same computation sequence is applied on all the corresponding bits ($k_i$, $l_i$) of the joint regular form of (k, l)

k=<$k_n$, ... $k_0$> and l=<$l_n$, ... $l_0$>.

In an embodiment of the encryption processing apparatus of the present invention, in the computation process, the computation execution section may perform a scalar multiplication of kP+lQ or $kD_1$+$lD_2$ without computing an addition point of P+Q or an addition divisor of $D_1$+$D_2$.

According to another embodiment of the present invention, there is provided an encryption processing method for use with an encryption processing apparatus for performing one of a scalar multiplication of kP+lQ based on two points P and Q on an elliptic curve defined by elliptic curve cryptography and scalar values k and l, and a scalar multiplication of $kD_1$+$lD_2$ based on divisors $D_1$ and $D_2$ defined by hyperelliptic curve cryptography and scalar values k and l, the encryption processing method including the steps of:

generating joint regular form of (k, l)

k=<$k_n$, ... $k_0$> and l=<$l_n$, ... $l_0$>, which are set so that all the bits of the scalar values k and l are represented by 0, +1, or −1, and the combination ($k_i$, $l_i$) of bits at positions corresponding to the scalar values k and l is set to satisfy ($k_i$, $l_i$)=(0, ±1) or (±1, 0); and performing a computation process of a scalar multiplication of kP+lQ or $kD_1$+$lD_2$ with the joint regular form of (k, l) generated in the scalar value control.

In an embodiment of the encryption processing method of the present invention, when both the scalar values k and l are even or odd, in the scalar value control, one of the scalar values may be changed to be set to a combination of an even number and an odd number, joint regular form of (k, l), k=<$k_n$, ... $k_0$> and l=<$l_n$, ... $l_0$>, may be generated in which the combination ($k_i$, $l_i$) of bits at positions corresponding to the changed scalar values k and l satisfies ($k_i$, $l_i$)=(0, ±1) or (±1, 0), and in the computation execution, a computation process of a scalar multiplication of kP+lQ or $kD_1$+$lD_2$ may be performed on the basis of the changed scalar values, a correction computation may be performed, and scalar double-and-add results may be computed by applying the scalar values before being changed.

In an embodiment of the encryption processing method of the present invention, in the computation execution, corresponding bits ($k_i$, $l_i$) of the joint regular form of (k, l), k=<$k_n$, ... $k_0$> and l=<$l_n$, ... $l_0$>, are selected, and a computation process to which a simultaneous computation technique of simultaneously computing a scalar multiplication of kP+lQ or $kD_1$+$lD_2$ is applied may be performed.

In an embodiment of the encryption processing method of the present invention, in the computation execution, a computation process to which the same computation sequence is applied may be performed on all the corresponding bits $(k_i, l_i)$ of the joint regular form of $(k, l)$, $k=<k_n, \ldots k_0>$ and $l=<l_n, \ldots l_0>$.

In an embodiment of the encryption processing method of the present invention, in the computation process, a scalar multiplication of $kP+lQ$ or $kD_1+lD_2$ may be performed without computing an addition point of $P+Q$ or an addition divisor of $D_1+D_2$.

According to another embodiment of the present invention, there is provided a computer program for enabling an encryption processing apparatus to perform one of a scalar multiplication of $kP+lQ$ based on two points P and Q on an elliptic curve defined by elliptic curve cryptography and scalar values k and l, and a scalar multiplication of $kD_1+lD_2$ based on divisors $D_1$ and $D_2$ defined by hyperelliptic curve cryptography and scalar values k and l, the computer program including:

generating joint regular form of $(k, l)$ $k=<k_n, \ldots k_0>$ and $l=<l_n, \ldots l_0>$, which are set so that all the bits of the scalar values k and l are represented by 0, +1, or −1, and the combination $(k_i, l_i)$ of bits at positions corresponding to the scalar values k and l is set to satisfy $(k_i, l_i)=(0, \pm 1)$ or $(\pm 1, 0)$; and performing a computation process of a scalar multiplication of $kP+lQ$ or $kD_1+lD_2$ with the joint regular form of $(k, l)$ generated in the-scalar value control.

The computer program of the present invention is, for example, a computer program that can be provided to a computer system, which is capable of executing various program codes, by means of a storage medium or a communication medium for providing the program codes in a computer-readable format, for example, a recording medium such as a CD, an FD, or an MO, or a communication medium such as a network. As a result of providing such a program in a computer-readable format, processing corresponding to the program is realized in the computer system.

According to the configuration of the present invention, in computation processes of the scalar multiplication of $kP+lQ$ based on two points P and Q on an elliptic curve defined by elliptic curve cryptography and scalar values k and l, and the scalar multiplication of $kD_1+lD_2$ based on divisors $D_1$ and $D_2$ defined by hyperelliptic curve cryptography and scalar values k and l, joint regular form of $(k, l)$ $k=<k_n, \ldots k_0>$ and $l=<l_n, \ldots l_0>$ are generated, which are set so that all the bits of the scalar values k and l are represented by 0, +1, or −1, and the combination $(k_i, l_i)$ of bits at positions corresponding to the scalar values k and l is set to satisfy $(k_i, l_i)=(0, \pm 1)$ or $(\pm 1, 0)$, and a process for computing the scalar multiplication of $kP+lQ$ or $kD_1+lD_2$ is performed with the joint regular form of $(k, l)$. Therefore, the same computation processing sequence can be performed in all the combinations of $(k_i, l_i)$. Differences in processing corresponding to a combination of bits do not occur, and resistance against power analysis is improved. Pre-computation of $P+Q$ and $D_1+D_2$ can be omitted, and a high-speed computation process is realized.

Other objects, features, and advantages of the present invention will become apparent from the embodiments of the present invention as will be described later and the attached drawings. In this specification, the system designates a logical assembly of a plurality of devices. It is not essential that the devices be disposed in the same housing.

BRIEF DESCRIPTION OF THE DRAWINGS

FIG. 2 shows a table in which processes of transforming from a binary representation of scalar values k and l into a JRF representation are summarized;

DETAILED DESCRIPTION

Figure 1:
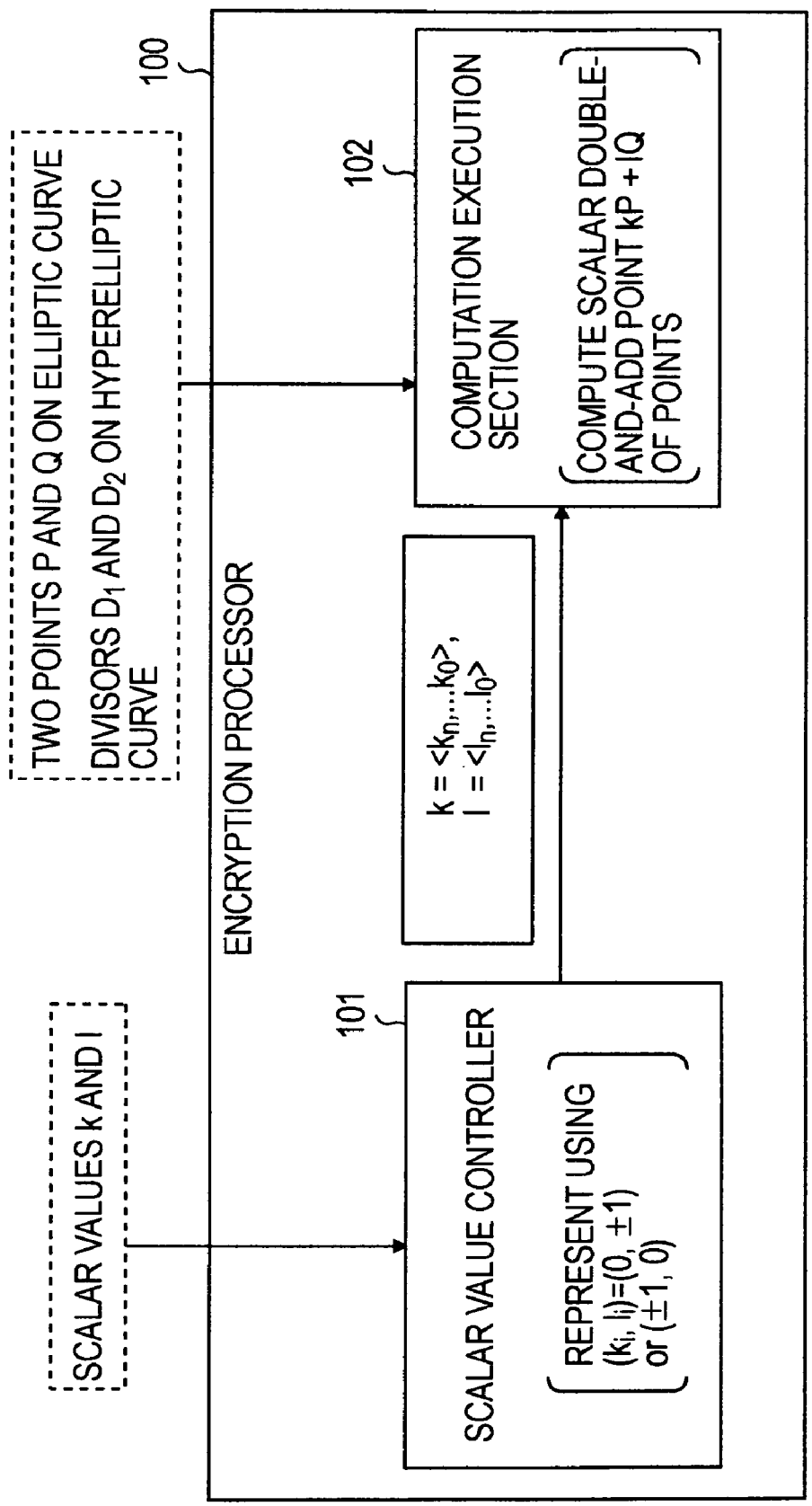
FIG. 1 illustrates an example of the configuration of an encryption processor for computing the scalar point multiplication in an encryption processing apparatus according to an embodiment of the present invention.

Details of an encryption processing apparatus, an encryption processing method, and a computer program according to embodiments of the present invention will be described below. The description will be given in accordance with the following items.

(1) Outline of elliptic curve cryptography and hyperelliptic curve cryptography.

(2) Specific configuration and examples of processing of the encryption processing apparatus of the present invention.

(3) Example of the configuration of the encryption processing apparatus.

(1) Outline of Elliptic Curve Cryptography and Hyperelliptic Curve Cryptography

The present invention realizes high-speed computation of the scalar double-and-add point $kP+lQ$ in elliptic curve cryptography and hyperelliptic curve cryptography known as a method in which elliptic curve cryptography is generalized, and further realizes computation of the scalar double-and-add point, having resistance against attacks, such as simple power analysis (SPA). An outline of elliptic curve cryptography and hyperelliptic curve cryptography will now be given.

As described above, elliptic curve cryptography is cryptography using the difficulty of solving a discrete logarithm problem on an elliptic curve and is said to have security equivalent to 1024-bit RSA encryption at 160 bits. In general, for elliptic curve cryptography, an elliptic curve $y^2=x^3+ax+b$ $(4a^3+27b^2\neq 0)$ on a prime field, an elliptic curve $y^2+xy=x^3+ax^2+b$ $(b\neq 0)$ on an extension field of two, and the like are used.

On the other hand, hyperelliptic curve cryptography (HECC) in which elliptic curve cryptography is generalized is a method proposed by Koblitz and Cantor. In elliptic curve cryptography (ECC) in which a finite field is denoted as Fq, when a point on an elliptic curve defined on a finite field Fq (in which $q=p^n$, p is a prime number) is denoted as P and a point kP (k∈Z) on which scalar multiplication is performed is denoted as Q, a problem of determining k from Q is basically a discrete logarithm problem. On the other hand, in hyperelliptic curve cryptography (HECC), when a divisor, which is the formal sum of points, is denoted as D, and a divisor defined by scalar multiplication $kD_1$ is denoted as $D_2$, a problem of determining k from $D_2$ becomes a discrete logarithm problem on a Jacobian variety on the hyperelliptic curve, and the difficulty of the mathematical solution exists. In the manner described above, hyperelliptic curve cryptography (HECC) is confirmed to have mathematical decryption difficulty and is expected as effective cryptography for public key encryption.

On a hyperelliptic curve, a value that characterizes a curve is genus g. At this time, a hyperelliptic curve C of genus g defined in a finite field Fq is defined by the following equation, $$Y^2 + h(x)y = f(x),$$

where h(x), f(x)∈Fq[x], f(x) are polynomial expressions of only a degree g (when p is an odd prime number, h=0), and f(x) is a monic polynomial expression of a degree 2 g+1.

When security equivalent to that of elliptic curve cryptography is assumed, the computation size (bit length) of a defined field of hyperelliptic curve cryptography is led to be reduced to 1/g in comparison with the computation size of a defined field of an elliptic curve on the basis of Hasse's theorem. The small computation size is useful in terms of implementation and can be cited as one of the advantages of hyperelliptic curve cryptography.

In the present invention, as high-speed computation having resistance against attacks such as simple power analysis (SPA), in the elliptic curve cryptography described above, computation of the scalar double-and-add point kP+lQ for points P and Q on an elliptic curve is realized, and in the hyperelliptic curve cryptography described above, computation of the addition divisor $kD_1+lD_2$ of a scalar doubling divisor with regard to $D_1$ and $D_2$, which are divisors of the formal sum of points, is realized.

(2) Specific Configuration and Examples of Processing of the Encryption Processing Apparatus of the Present Invention A description will now be given of a specific configuration and examples of processing performed by the encryption processing apparatus of the present invention. Referring to FIG. 1, a description will be given of an example of the configuration of an encryption processor 100 for computing the scalar double-and-add point kP+lQ in elliptic curve cryptography in the encryption processing apparatus of the present invention, and the addition divisor $kD_1+lD_2$ of a scalar doubling divisor with regard to divisors $D_1$ and $D_2$ in hyperelliptic curve cryptography.

P and Q are two points on an elliptic curve, $D_1$ and $D_2$ are divisors, each of which is a formal sum of points on a hyperelliptic curve, and k and l are given by a scalar quantity.

As shown in FIG. 1, in the encryption processing apparatus of the present invention, the encryption processor 100 for computing the scalar double-and-add point kP+lQ in elliptic curve cryptography or the addition divisor $kD_1+lD_2$ of a scalar doubling divisor in hyperelliptic curve cryptography includes a scalar value controller 101 and a computation execution section 102. In the following, an example of computing the scalar double-and-add point kP+lQ in elliptic curve cryptography will be described as an embodiment.

Computation of the addition divisor $kD_1+lD_2$ of a scalar doubling divisor in hyperelliptic curve cryptography can also be performed similarly to the computation process of kP+lQ.

The scalar value controller 101 receives scalar values k and l used to compute the scalar double-and-add point kP+lQ, and determines whether the scalar values k and l are even or odd. When the evenness and oddness of the scalar values k and l differ from each other, the scalar values k and l are expressed by progressions $k=<k_n \ldots k_0>$ and $l=<l_n \ldots l_0>$ of 0, 1, and −1, which satisfy $(k_i, l_i)=(0, \pm 1)$ or $(\pm 1, 0)$.

In the "simultaneous scalar point multiplication algorithm" of the related art described above, kP+lQ is computed by applying the algorithm described below by setting the scalar values k and l as a binary representation of $k=(k_n \ldots k_0)_2$ and $l=(l_n \ldots l_0)_2$.

"Simultaneous Scalar Point Multiplication Algorithm"
Input: Points P and Q on an elliptic curve
Scalar values k and l
Output: kP+lQ
1. Compute P+Q
2. T←$(k_n P + l_n Q)$
3. For i=n−1 downto 0 do
   T←2T
   If $(k_i, l_i) \neq (0, 0)$ then
   T←$T+(k_i P+l_i Q)$
4. Return T That is, in the configuration of the related art, the "algorithm of simultaneous scalar multiplication of point" is performed by setting a binary representation for which $k=(k_n \ldots k_0)_2$ and $l=(l_n \ldots l_0)_2$ with regard to each of the scalar values k and l, that is, by setting a binary representation of $(k_i, l_i)=(0, 0)$ or (0, 1), (1, 0), or (1, 1).

In the encryption process of the present invention, the scalar value controller 101 receives scalar values k and l used to compute the scalar double-and-add point kP+lQ, and determines whether the scalar values k and l are even or odd. When the evenness and oddness of the scalar values k and l differ from each other, the scalar values k and l are transformed into an extended binary representation in which each of the scalar values k and l is a progression of 0, 1, and −1 so as to satisfy $(k_i, l_i)=(0, \pm 1)$ or $(\pm 1, 0)$. The extended binary representation is expressed as $k=<k_n \ldots k_0>$ and $l=<l_n \ldots l_0>$.

In the extended binary representation of the scalar values k and l, the corresponding bits, that is, $(k_i, l_i)$, are set so as to satisfy the condition of $(k_i, l_i)=(0, \pm 1)$ or $(\pm 1, 0)$.

The expression of k and l that satisfies the above condition will be hereinafter referred to as a joint regular form (JRF).

In the encryption process of the present invention, the scalar value controller 101 determines the evenness or oddness of the scalar values k and l. When the evenness and oddness of the scalar values k and l differ from each other, that is, when one of (a) the scalar value k is even and the scalar value l is odd, and (b) when the scalar value k is odd and the scalar value l is even holds, the scalar values k and l are expressed by progressions $k=<k_n \ldots k_0>$ and $l=<l_n \ldots l_0>$ of 0, 1, and −1, which satisfy $(k_i, l_i)=(0, \pm 1)$ or $(\pm 1, 0)$. The scalar value controller 101 then inputs the progressions to the computation execution section 102 shown in FIG. 1. The computation execution section 102 computes the scalar double-and-add point kP+lQ of points in accordance with the above-described "simultaneous scalar point multiplication algorithm".

The computation execution section 102 performs the "simultaneous scalar point multiplication algorithm" described below.

"Simultaneous scalar point multiplication algorithm"
Input: points P and Q on an elliptic curve
  Scalar values k and l
Output: kP+lQ
1. Compute P+Q
2. T←($k_n$P+lQ)
3. For i=n−1 downto 0 do
   T←2T
   If ($k_i$, $l_i$)≠(0, 0) then
     T←T+($k_i$P+$l_i$Q)
4. Return T However, since ($k_i$, $l_i$)=(0, ±1) or (±1, 0) is set, in the process of step 3 in the above-described algorithm, ($k_i$, $l_i$)=(0, 0) does not hold, and in step 3, for all ($k_i$, $l_i$), the following processes are performed:

T←2T and

T←T+($k_i$P+$l_i$Q). That is, the same processing is performed on all (i), that is, on each bit of k and l that is expressed as an extended binary representation.

As a result, even if power analysis is performed, unlike a sequence of the related art in which processing is different depending on whether or not ($k_i$, $l_i$)=(0, 0), the same processing is performed on all the sets of ($k_i$, $l_i$), it is difficult to make a determination as to processing by power analysis such as SPA, and encryption processing having high resistance against power analysis is realized.

Furthermore, in the computation process of T←T+($k_i$P+$l_i$Q) in the processing performed in step 3, ($k_i$, $l_i$)=(0, ±1) or (±1, 0) is set. Therefore, in the computation of ($k_i$P+$l_i$Q) in T←T+($k_i$P+$l_i$Q), only four types of computations described below will occur:

(0*P)+((+1)*Q)=Q.

(0*P)+((−1)*Q)=−Q.

((+1)*P)+(0*Q)=P, and ((−1)*P)+(0*Q)=−P.

As a result, four values of −P, Q, −Q, and 4 need only to be computed.

This means that the pre-computation process in step 1 in the "simultaneous scalar point multiplication algorithm", that is, the following step of computing 1. Compute P+Q can be omitted.

The process for computing [P+Q] in step 1 is a computation step for allowing the computed value to be used when it becomes necessary to compute P+Q in step 3 by computing the value of [P+Q] in advance. In the sequence of the related art, in the process of step 3, that is, in the computation process of T← T+($k_i$P+$l_i$Q), a combination of ($k_i$, $l_i$)=(1, 1) may occur. When this combination occurs, it is set so that the values computed in advance in step 1 are used.

However, in this example of processing, since ($k_i$, $l_i$)=(0, ±1) or (±1, 0) is set, in the computation of ($k_i$P+$l_i$Q) in T←T+($k_i$P+$l_i$Q), only four values of P, −P, Q, and −Q occur, and the combination ($k_i$, $l_i$)=(1, 1) of bits for which a process for computing P+Q is necessary does not occur. As a result, the process for computing [P+Q] in advance in step 1 becomes unnecessary, the number of processing steps can be reduced by one, and high-speed computation is realized.

As described above, when the "simultaneous scalar point multiplication algorithm" is to be performed in accordance with a processing example of the present invention, when the input scalar values are a combination of an even number and an odd number, the scalar values are set to the joint regular form of ($k_i$, $l_i$)=(0, ±1) or (±1, 0), and the "simultaneous scalar point multiplication algorithm" is performed. As a result, in the "simultaneous scalar point multiplication algorithm", the following (a) and (b) are realized:

(a) the process of step 3 is performed as the same process in all the combinations of ($k_i$, $l_i$), and (b) the process of step 1 can be omitted.

As a result of the realization of (a) and (b) above, resistance against power analysis is improved, and high-speed computation is realized.

In the example of processing of the present invention, when the input scalar values are a combination of an even number and an odd number, the scalar value controller 101 shown in FIG. 1 sets the expression thereof to the following joint regular form ($k_i$, $l_i$)=(0, ±1) or (±1, 0)

and outputs the scalar values to the computation execution section 102, whereby the above-described "simultaneous scalar point multiplication algorithm" is performed.

The process in the scalar value controller 101 shown in FIG. 1, that is, the process for setting the joint regular form, will be described below. For example, when the input scalar values k and l are (k, l)=(52, 39), and k and l are set to an extended binary representation of (0, +1, and −1) and also set to a joint regular form for which k and l are in the relationship of ($k_i$, $l_i$)=(0, ±1) or (±1, 0), the following yields:

k=52=<1, 0, −1, 0, 1, 0, 0> and l=39=<0, 1, 0, 1, 0, −1, 1>.

A description will now be given below of a method for generating a joint regular form of scalar values k and l whose evenness or oddness differ from each other starting from the lower order as ($k_0$, $l_0$), . . . , ($k_n$, $l_n$).

The scalar value controller 101 shown in FIG. 1 receives scalar values k and l and determines whether these scalar values are even or odd. When k and l are a combination of an even number and an odd number, the scalar value controller 101 generates the joint regular form of the scalar values k and l from the binary representation of k and l.

The binary representation of the scalar values k and l is set as follows:

k=($k_n$ . . . $k_0$)$_2$ and l=($l_n$ . . . $l_0$)$_2$.

On the basis of the binary representation, the scalar value controller 101 generates the joint regular form of the scalar values k and l.

First, k and l are data whose evenness and oddness differ from each other. Naturally, the combination $(k_0, l_0)$ of the least significant bit of the binary representation of the scalar values k and l is:

$(k_0, l_0)=(0, 1)$ or $(k_0, l_0)=(1, 0)$.

The scalar value controller 101 targets the second bit from the lowest order of the binary representation of the scalar values k and l, that is, $(k_1, l_1)$, and performs a transformation process on the basis of the value of $(k_1, l_1)$. When $(k_1, l_1)=(0, 1)$ or $(1, 0)$, a transformation is not performed. That is, since the condition of the joint regular form, $(k_i, l_i)=(0, \pm1)$ or $(\pm1, 0)$, is satisfied, $(k_1, l_1)$ of the binary representation is made to be $(k_1, l_1)$ as is in the JRF.

On the other hand, when $(k_1, l_1)$ of the binary representation is $(0, 0)$, since $(k_i, l_i)=(0, \pm1)$ or $(\pm1, 0)$, which is the condition of the joint regular form, is not satisfied, the representation is changed. In this case, the scalar value controller 101 transforms the least significant bit and the second bit from the lowest order, $[k_1, k_0]$ and $[l_1, l_0]$, of the binary representation of the scalar values k and l on the basis of the value of the least significant bit $k_0$ of the binary representation of the scalar value k as described below and sets $(k_1, l_1)$ and $(k_0, l_0)$ in the JRF.

When $k_0=1$, that is, when $(k_1, l_1)=(0, 0)$ and $(k_0, l_0)=(1, 0)$, the following transformation processes are performed:

binary representation $[k_1, k_0]=[0, 1] \rightarrow$ JRF representation $[k_1, k_0]=[1, -1]$, and binary representation $[l_1, l_0]=[0, 0] \rightarrow$ JRF representation $[l_1, l_0]=[0, 0]$, and the JRF representation of k and l is set.

When $k_0=0$, that is, when $(k_1, l_1)=(0, 0)$ and $(k_0, l_0)=(0, 1)$, the following transformation processes are performed:

binary representation $[k_1, k_0]=[0, 0] \rightarrow$ JRF representation $[k_1, k_0]=[0, 0]$, and binary representation $[l_1, l_0]=[0, 1] \rightarrow$ JRF representation $[l_1, l_0]=[1, -1]$, and the JRF representation of k and l is set.

Also, when $(k_1, l_1)$ of the binary representation is $(1, 1)$, since the condition $(k_i, l_i)=(0, \pm1)$ or $(\pm1, 0)$, which is the condition of the joint regular form, is not satisfied, the representation is changed. In this case, on the basis of the least significant bit $k_0$ of the binary representation of the scalar value k, the scalar value controller 101 transforms the least significant bit and the second bit from the lowest order, $[k_1, k_0]$ and $[l_1, l_0]$, of the binary representation of the scalar values k and l as described below, and sets $(k_1, l_1)$ and $(k_0, l_0)$ in the JRF.

When $k_0=1$, that is, when $(k_1, l_1)=(1, 1)$ and $(k_0, l_0)=(1, 0)$, the following is performed:

binary representation $[k_1, k_0]=[1, 1] \rightarrow$ JRF representation $[k_1, k_0]=[0, -1]$ and binary representation $[l_1, l_0]=[1, 0] \rightarrow$ JRF representation $[l_1, l_0]=[1, 0]$. Furthermore, (+1) is carried over to the high-order bit $k_2$ of the binary representation of k. This transformation process is performed to set the JRF representation of k and l.

When $k_0=0$, that is, when $(k_1, l_1)=(1, 1)$ and $(k_0, l_0)=(0, 1)$, the following is performed:

binary representation $[k_1, k_0]=[1, 0] \rightarrow$ JRF representation $[k_1, k_0]=[1, 0]$ and binary representation $[l_1, l_0]=[1, 1] \rightarrow$ JRF representation $[l_1, l_0]=[0, -1]$. Furthermore (+1) is carried over to the high-order bit $l_2$ of the binary representation of l. This transformation process is performed to set the JRF representation of k and l.

As a result of performing the above processing, in all the cases of $(k_1, l_1)=(0, 0)$, $(0, 1)$, $(1, 0)$, and $(1, 1)$, the scalar values k and l are set to the combination of $(k_0, l_0)=(0, \pm1)$ or $(\pm1, 0)$, and $(k_1, l_1)=(0, 1)$ or $(1, 0)$.

Therefore, it becomes possible to satisfy the condition $(k_i, l_i)=(0, \pm1)$ or $(\pm1, 0)$, which is the condition of the joint regular form.

Next, also with respect to $(k_2, l_2)$, when $(k_2, l_2)=(0, 0)$ or $(1, 1)$, the same transformation as that described above is performed in the same manner as for $(k_1, l_1)$.

This process is sequentially performed from the low order toward the high order of the binary representation of the scalar values k and l, that is, $k=(k_n \ldots k_0)_2$ and $l=(l_n \ldots l_0)_2$. As a result of performing this process, the scalar values k and l can be expressed by progressions of 0, 1, and −1, $k=<k_n \ldots k_0>$ and $l=<l_n \ldots l_0>$, which satisfy $(k_i, l_i)=(0, \pm1)$ or $(\pm1, 0)$.

FIG. 2 shows a table in which processes for transforming from the binary representation of the scalar values k and l into the JRF representation are summarized.

When the binary representation of the scalar values k and l is set as $k=(k_n \ldots k_0)_2$ and $l=(l_n \ldots l_0)_2$, on the basis of the binary representation, the scalar value controller 101 sequentially generates the joint regular form of the scalar values k and l starting from the low-order bit of the binary representation of k and l.

As shown in FIG. 2, the scalar value controller 101 performs the following transformation processes in order to change the scalar values k and l to the JRF representation on the basis of the combination of the corresponding bits $(k_i, l_i)$ of k and l.

(1) When $(k_i, l_i)=(1, 0)$, $(k_i, l_i)$ is used as is as the JRF representation without change.

(2) When $(k_i, l_i)=(0, 1)$, $(k_i, l_i)$ is used as is as the JRF representation without change.

(3) When $(k_i, l_i)=(0, 0)$, (3a) when $(k_{i-1}, l_{i-1})=(1, 0)$, the scalar values k and l are changed to the following expressions $(k_i, k_{i-1})=[0, 1] \rightarrow JRF<1, -1>$ and $(l_i, l_{i-1})=[0, 0] \rightarrow JRF<0, 0>$ and the JRF representation is set.

(3b) When $(k_{i-1}, l_{i-1})=(0, 1)$, the scalar values k and l are changed to the following expressions $(k_i, k_{i-1})=[0, 0] \rightarrow JRF<0, 0>$, and $(l_i, l_{i-1})=[0, 1] \rightarrow JRF<1, -1>$ and the JRF representation is set.

(4) When $(k_i, l_i)=(1, 1)$, (4a) when $(k_{i-1}, l_{i-1})=(1, 0)$, the scalar values k and l are changed to the following expressions $(k_i, k_{i-1})=[1, 1] \rightarrow JRF<0, -1>$ and $(l_i, l_{i-1})=[1, 0] \rightarrow JRF<1, 0>$ and the JRF representation is set.

(4b) When $(k_{i-1}, l_{i-1})=(0, 1)$, the scalar values k and l are changed to the following expressions $$(k_i, k_{i-1})=[1, 0] \rightarrow JRF<1, 0>, \text{ and}$$

$$(l_i, l_{i-1})=[1, 1] \rightarrow JRF<0, -1>$$

and the JRF representation is set.

Figure 3:
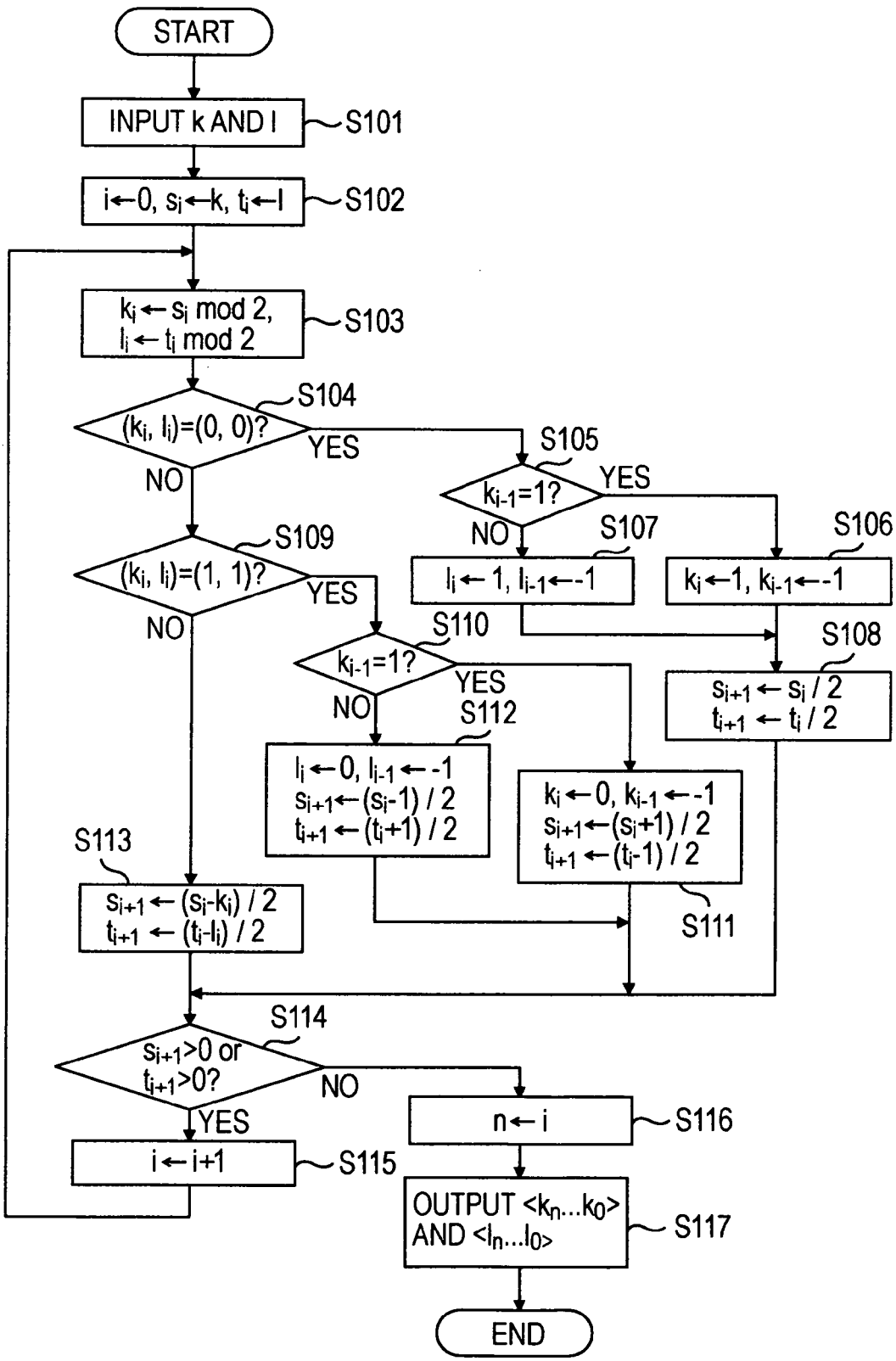
FIG. 3 is a flowchart illustrating Algorithm 1, which is an example of an algorithm for generating a JRF representation of scalar values k and l, which is performed by a scalar value controller.

A description will now be given, with reference to the flowchart shown in FIG. 3, of Algorithm 1, which is an example of a process for generating the JRF representation of scalar values k and l, which is to be performed by the scalar value controller 101.

Initially, in step S101, scalar values k and l used to compute the scalar double-and-add point kP+lQ of two different points P and Q on an elliptic curve are input. Next, in step S102, the scalar values k and l are initialized. That is, the following initializations of $i \leftarrow 0$, $s_i \leftarrow k$, and $t_i \leftarrow l$ are performed, where i corresponds to a variable i (i=0 to n) indicating the bit position as the binary representation of k and l.

Next, in step S103, least significant bits $k_i$ and $l_i$ of $s_i$ and $t_i$ of the respective scalar values k and l are computed. $k_i$ and $l_i$ are computed on the basis of the following formulas:

$$k_i \leftarrow s_i \bmod 2 \text{ and}$$

$$l_i \leftarrow t_i \bmod 2.$$

Next, in step S104, a determination is made as to the condition of the combination $(k_i, l_i)$ of the corresponding bits of the scalar values k and l. That is, first, it is determined whether or not $(k_i, l_i)=(0, 0)$.

When it is determined in step S104 that $(k_i, l_i)=(0, 0)$, the process then proceeds to step S105, where it is determined whether or not $k_{i-1}=1$.

When it is determined in step S105 that $k_{i-1}=1$, the process proceeds to step S106, where $k_i \leftarrow 1$ and $k_{i-1} \leftarrow -1$ are set. That is, the scalar value $[k_i, k_{i-1}]$ as the binary representation is set as $<1, -1>$ as the JRF representation. This process corresponds to the process of (3a) in FIG. 2.

When it is determined in step S105 that $k_{i-1} \neq 1$, the process proceeds to step S107, where $l_i \leftarrow 1$ and $l_{i-1} \leftarrow -1$ are set. That is, the scalar value $[l_i, l_{i-1}]$ as the binary representation is set as $<1, -1>$ as the JRF representation. This process corresponds to the process of (3b) in FIG. 2.

After the process of step S106 or S107, the process proceeds to step S108, and the following processes for updating $s_i$ and $t_i$ corresponding to the scalar values k and l, respectively, are performed:

$$s_{i+1} \leftarrow s_i/2 \text{ and}$$

$$t_{i+1} \leftarrow t_i/2.$$

These processes correspond to processes of discarding the low-order bits that are set to the JRF representation and extracting only the high-order bits that have not yet been processed.

When it is determined in step S104 that $(k_i, l_i) \neq (0, 0)$, the process then proceeds to step S109, where it is determined whether or not $(k_i, l_i)=(1, 1)$.

When it is determined in step S109 that $(k_i, l_i)=(1, 1)$, the process then proceeds to step S110, where it is determined whether or not $k_{i-1}=1$.

When it is determined in step S110 that $k_{i-1}=1$, the process proceeds to step S111, where $k_i \leftarrow 0$ and $k_{i-1} \leftarrow -1$ are set. That is, the scalar value $[k_i, k_{i-1}]$ as the binary representation is set as $<0, -1>$ as the JRF representation. Furthermore, the following processes for updating $s_i$ and $t_i$ corresponding to the scalar values k and l, respectively, are performed:

$$s_{i+1} \leftarrow (s_i+1)/2 \text{ and}$$

$$t_{i+1} \leftarrow (t_i)/2.$$

These processes correspond to processes for carrying over (+1) to the high-order bit $k_{i+1}$ of the binary representation of k, for discarding the low-order bit that are set to the JRF representation, and for extracting only the high-order bits that have not yet been processed. These processes correspond to the process of (4a) in FIG. 2.

When it is determined in step S110 that $k_{i-1} \neq 1$, the process proceeds to step S112, where $l_i \leftarrow 0$ and $l_{i-1} \leftarrow -1$ are set. That is, the scalar value $[l_i, l_{i-1}]$ as the binary representation is set as $<0, -1>$ as the JRF representation. Furthermore, the following processes for updating $s_i$ and $t_i$ corresponding to the scalar values k and l, respectively, are performed:

$$s_{i+1} \leftarrow (s_{i-1})/2 \text{ and}$$

$$t_{i+1} \leftarrow (t_{i+1})/2.$$

These processes correspond to processes for carrying over (+1) to the high-order bit $l_{i+1}$ of the binary representation of l, for discarding the low-order bits that are set to the JRF representation, and for extracting only the high-order bits that have not yet been processed. These processes correspond to the process of (4b) in FIG. 2.

When it is determined in step S109 that $(k_i, l_i) \neq (1, 1)$, the process then proceeds to step S113, where the following processes for updating $s_i$ and $t_i$ corresponding to the scalar values k and l, respectively, are performed:

$$s_{i+1} \leftarrow (s_i-k_i)/2 \text{ and}$$

$$t_{i+1} \leftarrow (t_i-l_i)/2.$$

These processes correspond to processes for using $(k_i, l_i)$ as the binary representation as is as the JRF representation, for discarding the low-order bits that are set to the JRF representation, and for extracting only the high-order bits that have not yet been processes. These processes correspond to the processes (1) and (2) in FIG. 2.

Next, it is determined in step S114 whether or not $s_{i+1}>0$ holds or $t_{i+1}>0$ holds. This is a process for determining whether or not a high-order bit of the binary representation, which has not yet been transformed into the JRF representation, exists. When it is determined in step S114 that $s_{i+1}>0$ holds or $t_{i+1}>0$ holds, this means that the high-order bit of the binary representation, which has not yet been transformed into the JRF representation, exists. Therefore, in step S115, the variable i is updated, that is, $i \leftarrow i+1$ is performed. The process then returns to step S103, and identical processing is repeatedly performed.

When it is determined in step S114 that $s_{i+1}>0$ does not hold or $t_{i+1}>0$ does not hold, this means that the high-order bit of the binary representation, which has not yet been transformed into the JRF representation, does not exist. Therefore, the process proceeds to step S116, where a process for setting the finally set variable i to n, that is, an updating process of $n \leftarrow i$ is performed. In step S117, as the JRF representation of the scalar values k and l, the following is output:

$$k=<k_n, \ldots k_0> \text{ and}$$

$$l=<l_n, \ldots l_0>.$$

As a result of the above processing, the scalar value controller 101 shown in FIG. 1 expresses the binary representation of the scalar values k and l, $k=(k_n \ldots k_0)_2$ and $l=(l_n \ldots l_0)_2$ by extended binary representation, that is, expresses all the bits by 0, +1, or −1, and also generates $k=<k_n, \ldots k_0>$ and $l=<l_n, \ldots l_0>$ as the JRF representation that satisfy $k_i, l_i)=(0, \pm 1)$ or $(\pm, 0)$, which is the condition of the joint regular form, and outputs them to the computation execution section 102. The computation execution section 102 performs the "simultaneous scalar point multiplication algorithm" described previously on the basis of the scalar values of $$k=<k_n, \ldots k_0> \text{ and}$$

$$l=<l_n, \ldots l_0>$$

as the JRF representation of the scalar values k and l input from the scalar value controller 101. As a result of the processing, in the "algorithm of simultaneous scalar point multiplication",
(a) the same computation process is performed in all the combinations of $(k_i, l_i)$, and
(b) the computation process of P+Q can be omitted.

As a result of the realization of the above (a) and (b), resistance against power analysis is improved, and high-speed computation can be performed.

Algorithm 1, which is an algorithm for generating the JRF representation, described with reference to FIG. 3, can be summarized as described below.

Algorithm 1
1. Inputs are made as follows: $i \leftarrow 0$, $s_i \leftarrow k$, and $t_i \leftarrow l$.
2. The least significant bits of $s_i$ and $t_i$ are set as $k_i$ and $l_i$, respectively.
3. When $(k_i, l_i)=(0, 0)$, the following is performed.
    When $k_{i-1}=1$, transformations are performed as follows:

$$k_i \leftarrow 1 \text{ and } k_{i-1} \leftarrow -1.$$

When $k_{i-1}=0$, transformations are performed as follows:

$$l_i \leftarrow 1 \text{ and } l_{i-1} \leftarrow -1.$$

$$s_{i+1} \leftarrow s_i/2 \text{ and } t_{i+1} \leftarrow t_i/2.$$

4. When $(k_i, l_i)=(1, 1)$, the following is performed.
    When $k_{i-1}=1$, transformations are performed as follows:

$$k_i \leftarrow 0, k_{i-1} \leftarrow -1, \text{ and}$$

$$s_{i+1} \leftarrow (s_i+1)/2, t_{i+1} \leftarrow (t_i-1)/2.$$

When $k_{i-1}=0$, transformations are performed as follows:

$$l_i \leftarrow 0, l_{i-1} \leftarrow -1, \text{ and}$$

$$s_{i+1} \leftarrow (s_i-1)/2 \text{ and } t_{i+1} \leftarrow (t_i+1)/2.$$

5. When other than the above-described 3 and 4, that is, when $(k_i, l_i)=(0, 1)$ or $(1, 0)$, $$s_{i+1} \leftarrow (s_i-k_i)/2 \text{ and } t_{i+1} \leftarrow (t_i-l_i)/2.$$

6. When $s_{i+1}>0$ or $t_{i+1}>0$,
    $i \leftarrow i+1$ is set, and the process returns to 2. When otherwise, $n \leftarrow i$ is set, and $<k_n \ldots k_0>$ and $<l_n \ldots l_0>$ are output.

Figure 4:
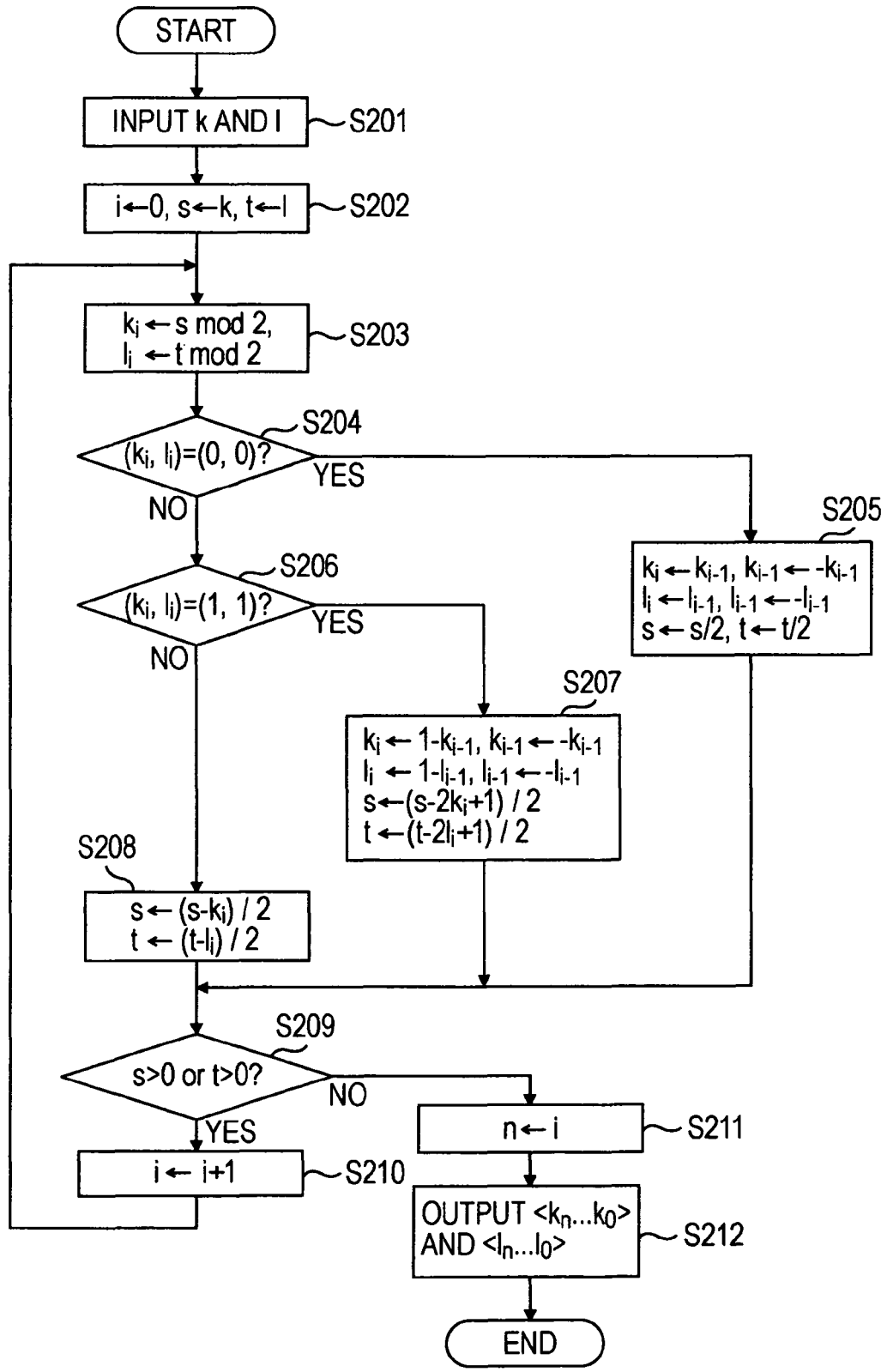
FIG. 4 is a flowchart illustrating Algorithm 2, which is an example of an algorithm for generating a JRF representation of scalar values k and l, which is performed by a scalar value controller.

Next, a description will be given, with reference to the flowchart shown in FIG. 4, of Algorithm 2 in which the above-described algorithm 1 is optimized so that the number of branches is reduced. Algorithm 2 is also an example of an algorithm for generating the JRF representation of the scalar values k and l, and is performed by the scalar value controller 101 in the encryption processor 100 shown in FIG. 1.

The processes of steps S201 to S203 are processes nearly identical to those of steps S101 to S103 in Algorithm 1. That is, initially, in step S201, scalar values k and l used to compute the scalar double-and-add point kP+lQ of two different points P and Q on an elliptic curve are input. Next, in step S202, the scalar values k and l are initialized. That is, the following initializations are performed:

$$i \leftarrow 0, s \leftarrow k, \text{ and } t \leftarrow 1$$

where i corresponds to a variable i (i=0 to n) indicating the bit position as the binary representation of k and l.

Next, in step S203, the least significant bit $k_i$ of each of s and t corresponding to the scalar values k and l respectively is computed. $k_i$ and $l_i$ are computed on the basis of the following equations:

$$k_i \leftarrow s \bmod 2, \text{ and}$$

$$l_i \leftarrow t \bmod 2.$$

Next, in step S204, a determination is made as to the state of the combination of the corresponding bits of the scalar values k and l. That is, first, it is determined whether or not $(k_i, l_i)=(0, 0)$.

When it is determined in step S204 that $(k_i, l_i)=(0, 0)$, the process then proceeds to step S205, where the following settings are performed:

$$k_i \leftarrow k_{i-1},$$

$$k_{i-1} \leftarrow -k_{i-1},$$

$$l_i \leftarrow l_{i-1}, \text{ and}$$

$$l_{i-1} \leftarrow -l_{i-1}.$$

That is, the scalar value $[k_i, k_{i-1}]$ based on the binary representation is set as $<k_{i-1}, -k_{i-1}>$ as the JRF representation, and $[l_i, l_{i-1}]$ is set as $<l_{i-1}, -l_{i-1}>$ as the JRF representation. These processes correspond to the processes (3a) and (3b) in FIG. 2.

In step S205, the following processes are performed as processes for updating s and t corresponding to the scalar values k and l, respectively:

$$s \leftarrow s/2 \text{ and}$$

$$t \leftarrow t/2.$$

These processes correspond to processes for discarding the low-order bits that are set to the JRF representation and for extracting only the high-order bits that have not yet been processed.

When it is determined in step S204 that $(k_i, l_i) \ne (0, 0)$, the process then proceeds to step S206, where it is determined whether or not $(k_i, l_i)=(1, 1)$.

When it is determined in step S206 that $(k_i, l_i)=(1, 1)$, the process then proceeds to step S207, where the following settings are performed:

$$k_i \leftarrow 1-k_{i-1},$$

$$k_{i-1} \leftarrow -k_{i-1}, \text{ and}$$

$$l_{i-1} \leftarrow -l_{i-1}.$$

The scalar value $[k_i, k_{i-1}]$ based on the binary representation is set as $<1-k_{i-1}, -k_{i-1}>$ as the JRF representation, and $[l_i, l_{i-1}]$ is set as $<1-l_{i-1}, -l_{i-1}>$ as the JRF representation. These processes correspond to the processes of (4a) and (4b) in FIG. 2.

In step S207, the following processes are performed as processes for updating s and t corresponding to the scalar values k and l, respectively:

$$s \leftarrow (s-2k_{i+1})/2 \text{ and}$$

$$t \leftarrow (t-l_i)/2.$$

These processes correspond to processes for discarding the low-order bits that are set to the JRF representation and for extracting only the high-order bits that have not yet been processed.

When it is determined in step S206 that $(k_i, l_i) \neq (1, 1)$, the process then proceeds step S208, where the following processes for updating s and t corresponding to the scalar values k and l, respectively, are performed:

$S \leftarrow (s-k_i)/2$ and $T \leftarrow (t-l_i)/2$.

These processes correspond to processes for using $(k_i, l_i)$ as the binary representation as is as the JRF representation, for discarding the low-order bits that are set to the JRF representation, and for extracting only the high-order bits that have not yet been processed. These processes correspond to the processes of (1) and (2) in FIG. 2.

Next, it is determined in step S209 whether or not s>0 holds or t>0 holds. This is a process for determining whether or not the high-order bit of the binary representation, which has not yet been transformed into the JRF representation, exists. When it is determined in step S209 that s>0 holds or t>0 holds, this means that the high-order bit of the binary representation, which has not yet been transformed into the JRF representation, exists. Therefore, in step S210, the process for updating the variable i, that is, $i \leftarrow i+1$, is performed. The process then returns to step S203, and identical processing is repeatedly performed.

When it is determined in step S209 that s>0 does not hold or t>0 does not hold, this means that the high-order bit of the binary representation, which has not yet been transformed into the JRF representation, does not exist. Therefore, the process proceeds to step S211, where the process for setting the finally set variable i to n, that is, the updating process of $n \leftarrow I$, is performed. In step S212, as the JRF representation of the scalar values k and l, $k=\langle k_n, \ldots k_0 \rangle$ and $l=\langle l_n, \ldots l_0 \rangle$ are output.

As a result the above processing, the scalar value controller 101 of the encryption processor 100 shown in FIG. 1 expresses the binary representation of the scalar values k and l, $k=(k_n \ldots k_0)_2$ and $l=(l_n \ldots l_0)2$, as extended binary representation, that is, expresses all the bits by 0, +1, or −1, generates $k=\langle k_n, \ldots k_0 \rangle$ and $l=\langle l_n, \ldots l_0 \rangle$ as the JRF representation, which satisfy $(k_i, l_i)=(0, \pm 1)$ or $(\pm 1, 0)$, which is the condition of the joint regular form, and outputs them to the computation execution section 102. The computation execution section 102 performs the "algorithm of simultaneous scalar point multiplication" described previously on the basis of the scalar values of $k=\langle k_n, \ldots k_0 \rangle$ and $l=\langle l_n, \ldots l_0 \rangle$ as the JRF representation of the scalar values k and l input from the scalar value controller 101. As a result of the above processing, in the "algorithm of simultaneous scalar point multiplication", (a) the same computation process is performed in all the combinations of $(k_i, l_i)$, and (b) the computation process of P+Q can be omitted.

Since the above-described (a) and (b) are realized, resistance against power analysis is improved, and high-speed computations can be performed.

Algorithm 2, which is an algorithm for generating the JRF representation, described with reference to FIG. 4 can be summarized as described below.

Algorithm 2
1. Inputs are made as follows: $i \leftarrow 0$, $s \leftarrow k$, and $t \leftarrow 1$.
2. The least significant bits of s and t are set as $k_i$ and $l_i$, respectively.
3. When $(k_i, l_i)=(0, 0)$, the following is set:

$k_i \leftarrow k_{i-1}, k_{i-1} \leftarrow -k_{i-1}$, $l_i \leftarrow l_{i-1}, l_{i-1} \leftarrow -l_{i-1}$, $s \leftarrow s/2$, and $t \leftarrow t/2$.

4. When $(k_i, l_i)=(0, 0)$, the following is set:

$k_i \leftarrow 1-k_{i-1}, k_{i-1} \leftarrow -k_{i-1}$, $l_i \leftarrow 1-l_{i-1}, l_{i-1} \leftarrow -l_{i-1}$, $s \leftarrow (s-2k_i+1)/2$, and $t \leftarrow (t-2l_i+1)/2$.

5. When other than the above-described 3 and 4, the following is set:

$s \leftarrow (s-k_i)/2$ and $t \leftarrow (t-l_i)/2$.

6. When s>0 or t>0,
$i \leftarrow i+1$ is set, and the process returns to 2. When otherwise, $n \leftarrow i$ is performed, and $\langle k_n, \ldots k_0 \rangle$ and $\langle l_n, \ldots l_0 \rangle$ are output.

Figure 5:
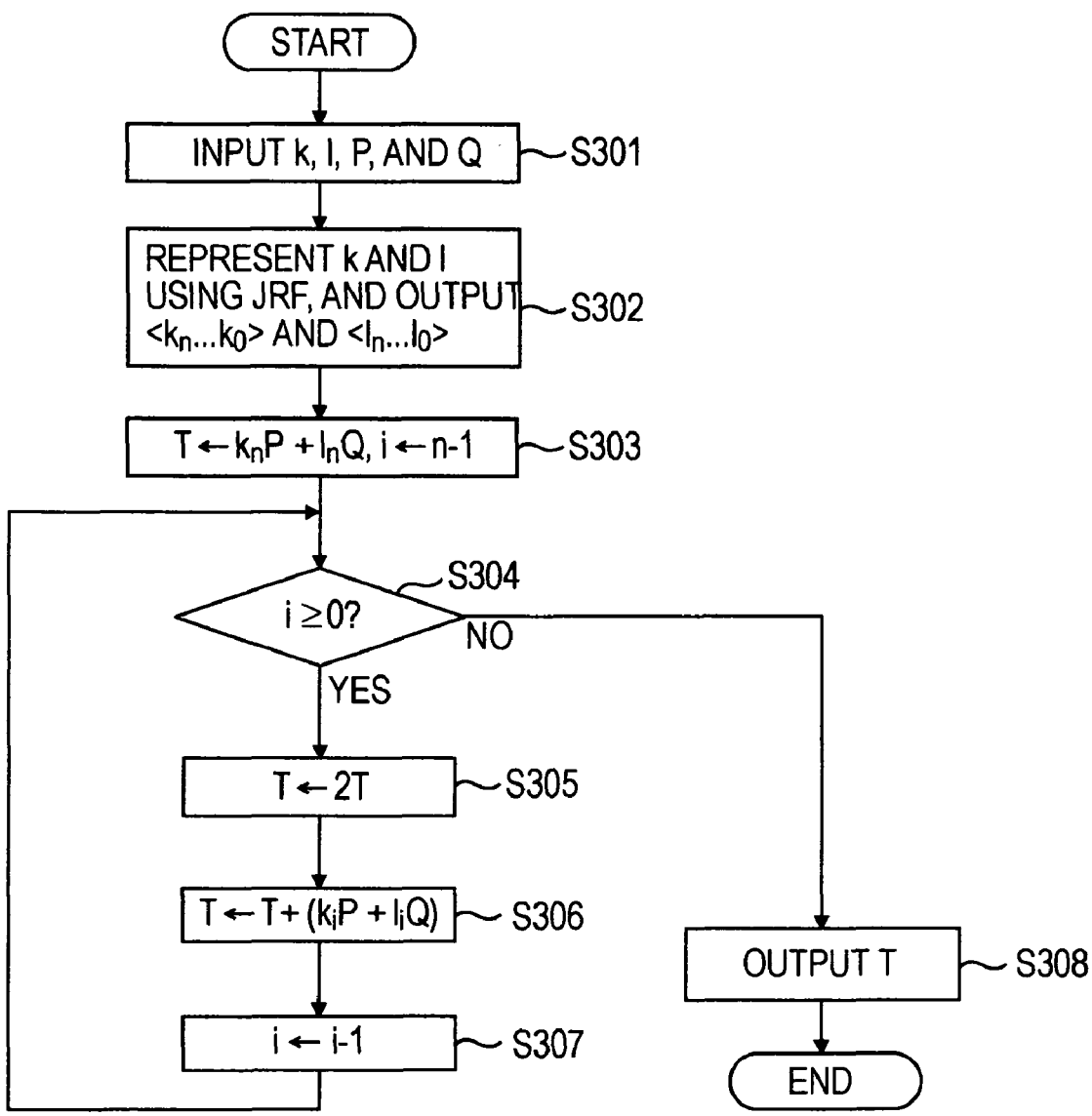
FIG. 5 shows a flowchart illustrating Algorithm 3 as the overall algorithm of processing performed by the encryption processor.

Next, a description will be given, with reference to the flowchart in FIG. 5, of the overall processing of the "simultaneous scalar point multiplication algorithm", which is performed by the encryption processor 100 shown in FIG. 1, that is, the overall algorithm of processing to be performed by the scalar value controller 101 and the computation execution section 102. This algorithm will be hereinafter referred to Algorithm 3.

The computation execution section 102 of the encryption processor 100 shown in FIG. 1 receives the scalar values of $k=\langle k_n, \ldots k_0 \rangle$ and $l=\langle l_n, \ldots l_0 \rangle$ as the JRF representation of the scalar values k and l input from the scalar value controller 101, and computes the scalar double-and-add point [kP+lQ] of points. Basically, the "simultaneous scalar point multiplication algorithm" described previously is performed. As described previously, (a) the same computation process is performed in all the combinations of $(k_i, l_i)$, and (b) the computation process of P+Q can be omitted.

The above-described (a) and (b) are realized, and an algorithm different from the computation algorithm of the related art is performed. Referring to the flowchart shown in FIG. 5, the "algorithm of simultaneous scalar point multiplication" of the present invention will now be described.

Initially, in step S301, the encryption processor receives scalar values k and l and points P and Q on an elliptic curve as parameters necessary to compute the scalar double-and-add point [kP+lQ] of points.

Next, in step S302, the scalar values k and l are transformed into $k=\langle k_n, \ldots k_0 \rangle$ and $l=\langle l_n, \ldots l_0 \rangle$ as the JRF representation. This process is a process performed by the scalar value controller 101 shown in FIG. 1, and is performed in accordance with Algorithm 1 described previously with reference to FIG. 3 or in accordance with Algorithm 2 described previously with reference to FIG. 4.

The processing of step S303 and subsequent steps is a "simultaneous scalar point multiplication process" performed by the computation execution section 102 shown in FIG. 1. This process is basically based on the "simultaneous scalar point multiplication algorithm" as a technique of the related art described previously, which is shown below, and has a plurality of changed points.

The "Simultaneous Scalar Point Multiplication Algorithm"

Input: Points P and Q on an elliptic curve
Scalar values k and l
Output: kP+lQ
1. Compute P+Q
2. T←($k_n$P+lQ)
3. For i=n−1 downto 0 do
T←2T
If ($k_i$, $l_i$)≠(0, 0) then
T←T+($k_i$P+$l_i$Q)
4. Return T.

Initially, in step S303, the following is set:

$$T \leftarrow (k_n P + lQ) \text{ and } i \leftarrow n-1.$$

This process is performed as a process corresponding to step 2 in the "simultaneous scalar point multiplication algorithm" of the related art. i is used as a variable indicating the bit position of k=<$k_n$, . . . $k_0$> and l=<$l_n$, . . . $l_0$> as the JRF representation.

In the algorithm of the present invention, the computation process of "Compute P+Q" of step 1 in the "simultaneous scalar point multiplication algorithm" of the related art is omitted.

Next, in step S304, it is determined whether or not i≧0 holds. When i≧0 does not hold, this means that the computation process of kP+lQ has been completed.

When i≧0 holds, this means that the computation process of kP+lQ has not been completed. The process then proceeds to step S305, where T←2T is set. Furthermore, in step S306, T←T +($k_i$P+$l_i$Q) is performed. This process is performed as a process corresponding to step 3 in the "simultaneous scalar point multiplication algorithm" of the related art.

In step 3 in the "simultaneous scalar point multiplication algorithm" of the related art, a process performed as a selective process based on the value of ($k_i$, $l_i$), that is, If ($k_i$, $l_i$)≠(0, 0) then $$T \leftarrow T + (k_i P + l_i Q)$$

is performed in all the combinations of ($k_i$, $l_i$) in the processing according to an embodiment of the present invention. As a result of the processing, it becomes possible to make analysis of power analysis bit values difficult.

Next, in step S307, as a process for updating the variable i, i←i+1 is performed. Step S304 and subsequent steps are repeatedly performed.

Finally, when it is determined in step S304 that i≧0 does not hold, it is determined that the computation process of kP+lQ has been completed. Then, in step S308, T=kP+lQ is output, and the processing is completed.

As described above, in the simultaneous scalar point multiplication algorithm of the present invention, the computation process of "Compute P+Q" of step 1 in the "simultaneous scalar point multiplication algorithm" of the related art described previously is omitted, and the process of step 3 is performed as the same process in all the combinations of ($k_i$, $l_i$). As a result, resistance against power analysis is improved and also, high-speed computation can be performed.

Algorithm 3, which is a simultaneous scalar point multiplication algorithm of the present invention described with reference to FIG. 5, can be summarized as described below.

Algorithm 3
1. Represent k and l using JRF, and output $$<k_n \ldots k_0> \text{ and } <l_n \ldots l_0>.$$

2. Set T←($k_n$P+$l_n$Q) and $$i \leftarrow n-1.$$

3. If not i≧0, output T, and end the processing.
4. Compute T←2T using point doubling.
5. Compute T←T+($k_i$P+$l_i$Q) using point addition.
6. Set i←n−1, and return to 3.

The processing flow described above with reference to FIG. 5 is a simultaneous scalar point multiplication algorithm for computing kP+lQ. The processing is assumed on a case in which the scalar values k and l are a combination of an even number and an odd number, that is, on one of a case in which k is even and l is odd and a case in which k is odd and l is even. The reason for this is that it is a necessary condition for satisfying ($k_i$, $l_i$)=(0, ±1) or (±1, 0), which is the condition of the joint regular form.

However, the input scalar values k and l are not always a combination of an even number and an odd number in the scalar double-and-add point [kP+lQ] of points, which should be computed by the encryption processor 100 of FIG. 1. A description will be given, with reference to the flowchart shown in FIG. 6, a processing sequence Algorithm 4 that is capable of dealing with a case in which the scalar values k and l are a combination of an even number and an odd number and also both are even or odd and that improves resistance against power analysis and realizes high-speed computation processing.

Figure 6:
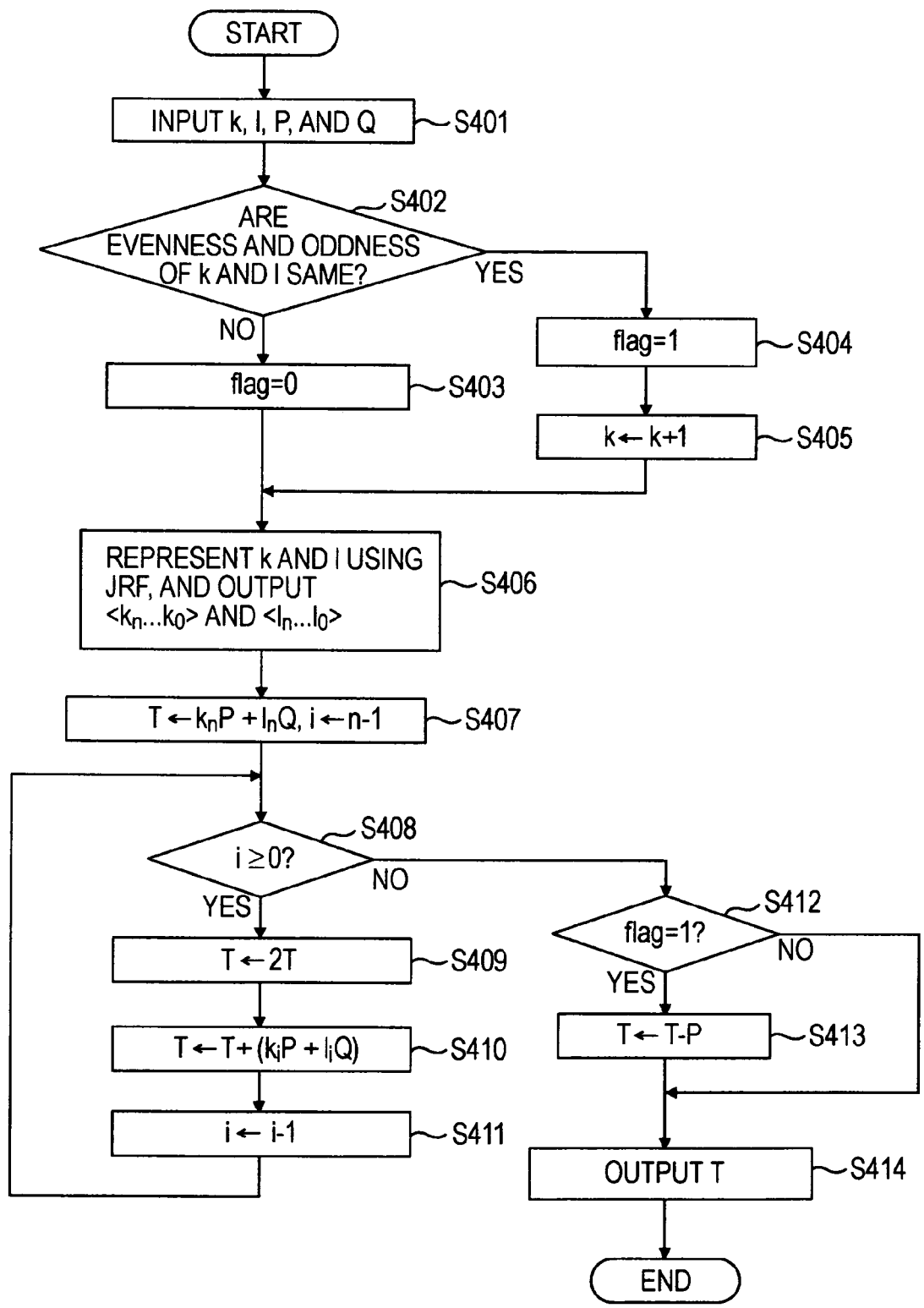
FIG. 6 shows a flowchart illustrating Algorithm 4 as the overall algorithm of processing performed by the encryption processor.

Algorithm 4 in accordance with the flowchart shown in FIG. 6 is performed by the encryption processor 100 shown in FIG. 1. Initially, in step S401, the encryption processor receives scalar values k and l and points P and Q on an elliptic curve as parameters necessary to compute the scalar double-and-add point [kP+lQ] of points.

The processes of steps S402 to S406 are performed by the scalar value controller 101 shown in FIG. 1. Initially, in step S402, it is determined whether the scalar values k and l are even or odd. That is, it is determined whether or not both k and l are even or odd.

When it is determined in step S402 that both are even or odd, if the input k and l are maintained as they are, it is difficult to set the JRF representation that satisfies ($k_i$, $l_i$)=(0, ±1) or (±1, 0), which is the condition of the joint regular form. For this reason, in steps S404 and S405, a flag is set, and the scalar values are adjusted. That is, in step S404, flag[1] indicating that the scalar values will be adjusted is set. For example, this is set as a flag corresponding to the processing data of kP+lQ in an accessible memory of the encryption processor 100.

Next, in step S405, a process for changing the scalar value k to k+1 is performed. As a result of this process, the updated k and l are changed to a combination of an even number and an odd number, and thus the JRF representation that satisfies ($k_i$, $l_i$)=(0, ±1) or (±, 0), which is the condition of the joint regular form, can be set.

On the other hand, when it is determined in step S402 that k and l are not a combination of even numbers or odd numbers, but are a combination of an even number and an odd number, even if the input k and l are not changed, the JRF representation that satisfies ($k_i$, $l_i$)=(0, ±1) or (±1, 0), which is the condition of the joint regular form, can be set. In step S403, flag[0] indicating that the scalar values have not been adjusted is set.

After the process of step S403 or S405, in step S406, the scalar values k and l are transformed into k=<$k_n$, . . . $k_0$> and $l=<l_n, \ldots l_0>$ as the JRF representation. This process is a process to be performed by the scalar value controller 101 shown in FIG. 1 and is performed in accordance with Algorithm 1 described previously with reference to FIG. 3 or Algorithm 2 described previously with reference to FIG. 4.

The processing of step S407 and subsequent steps is a "simultaneous scalar point multiplication process" performed by the computation execution section 102 shown in FIG. 1. This process is based on the "simultaneous scalar point multiplication algorithm" as the related art described previously and has a plurality of changed points similarly to that described with reference to FIG. 5.

Initially, in step S407, the following is set:

$$T \leftarrow (k_n P + l_n Q) \text{ and}$$

$$i \leftarrow n-1.$$

This process is performed as a process corresponding to step 2 in the "simultaneous scalar point multiplication algorithm" of the related art. i is used as a variable indicating the bit position of $k=<k_n, \ldots k_0>$ and $l=<l_n, \ldots l_0>$ as the JRF representation. Also, in this algorithm, the computation process of "Compute P+Q" of step 1 in the "simultaneous scalar point multiplication algorithm" of the related art is omitted.

Next, in step S408, it is determined whether or not $i \geq 0$ holds. When $i \geq 0$ does not hold, this means that the computation process of kP+lQ has been completed.

When $i \geq 0$ holds, this means that the computation process of kP+lQ has not been completed. The process then proceeds to step S409, where $T \leftarrow 2T$ is performed. Furthermore, in step S410, the process for updating $T \leftarrow T + (k_i P + l_i Q)$ is performed. This process is performed as a process corresponding to step 3 in the "simultaneous scalar point multiplication algorithm" of the related art. Also, in this example of processing, similarly to Algorithm 3 described previously with reference to FIG. 5, in step 3 in the "simultaneous scalar point multiplication algorithm" of the related art, the process performed as a selective process based on the value of $(k_i, l_i)$, that is, If $(k_i, l_i) \neq (0, 0)$ then $$T \leftarrow T + (k_i P + l_i Q)$$

is performed in all the combinations of $(k_i, l_i)$ in Algorithm 4. As a result of the processing, it becomes possible to make analysis of power analysis bit values difficult.

Next, in step S411, the process for updating the variable $i \leftarrow i+1$ is performed, and processing of step S408 and subsequent steps is repeatedly performed.

Finally, when it is determined in step S408 that $i \geq 0$ does not hold, it is determined that the computation process of kP+lQ has been completed, and a determination is made in step S412 as to the set flag. When the flag has been set to [1], it is determined that the scalar value [k] used to compute T=kP+lQ, which is computed by the computation execution section, is not the input scalar value and is a scalar value updated in the process of $k \leftarrow k+1$ in step S405. Then, in step S413, correction computation of $T \leftarrow T - P$ is performed. After this correction computation, in step S414, T=kP+lQ is output as the computation result, and the processing is completed.

When it is determined in step S412 that the flag has not been set to [1], the scalar value [k] used to compute T=kP+lQ, which is computed by the computation execution section, is an input scalar value, and thus the correction process of step S405 is omitted. In step S414, as a computation result, T=kP+lQ is output, and the processing is completed.

As described above, in Algorithm 4 described with reference to FIG. 6, it is possible to deal with any combination of the scalar values k and l that are input. When the input scalar values k and l are a combination of an even number and an odd number and also when both the input scalar values k and l are even or odd, resistance against power analysis is improved, and high-speed computation can be realized.

That is, the computation process of "Compute P+Q" in step 1 in the "simultaneous scalar point multiplication algorithm" of the related art described previously is omitted. Furthermore, the process of step 3 is performed as the same process in all the combinations of $(k_i, l_i)$. As a result, resistance against power analysis is improved and also, high-speed computation becomes possible.

Algorithm 4, which is the "simultaneous scalar point multiplication algorithm" of the present invention described with reference to FIG. 6, can be summarized as described below.

Algorithm 4
1. When the evenness and oddness of k and l are the same, set $k \leftarrow k+1$, and flag$\leftarrow 1$. When otherwise, set flag$\leftarrow 0$.
2. Represent k and l using JRF, and output $<k_n \ldots k_0>$ and $<l_n \ldots k_0>$.
3. Set $T \leftarrow (k_n P + l_n Q)$, and $i \leftarrow n-1$.
4. If not $i \geq 0$, the process proceeds to 8.
5. Compute $T \leftarrow 2T$ using point doubling.
6. Compute $T \leftarrow T + (k_i P + l_i Q)$ using point addition.
7. Set $i \leftarrow n-1$, and returns to 3.
8. If flag=1, set $T \leftarrow T - P$, and output T.

According to this example of processing, processing for any scalar values k and l is possible, and simultaneous scalar multiplication of kP+lQ can be performed without revealing information other than the evenness and oddness of k and l. The above-described embodiment is set in such a manner that the input scalar values are changed by adding +1 to the scalar value k. When both the input scalar values are even or odd, the values need only to be changed to a combination of an even number and an odd number. The scalar values k and l can be changed variously without being limited to the above-described example of processing ($k \leftarrow k+1$). However, after the computation in which the changed scalar values are used, it is necessary to perform correction computation for returning the changes to the original.

In each algorithm described with reference to FIGS. 3 to 6, an example of computing the scalar double-and-add point kP+lQ in elliptic curve cryptography has been described as an embodiment. As described previously, the computation of an addition divisor $kD_1 + lD_2$ of a scalar doubling divisor in hyperellictic curve cryptography can be performed similarly to the computation process of kP+lQ. That is, the encryption processing apparatus of the present invention is an encryption processing apparatus for performing encryption processing computation corresponding to elliptic curve cryptography or hyperellictic curve cryptography. The encryption processing apparatus performs a scalar multiplication of kP+lQ based on two points P and Q on an elliptic curve defined by elliptic curve cryptography and scalar values k and l, and a scalar multiplication of $kD_1 + lD_2$ based on divisors $D_1$ and $D_2$ defined by hyperelliptic curve cryptography and the scalar values k and l.

The scalar value controller 101 shown in FIG. 1 is a scalar value controller for generating joint regular form of (k, l)

$k=<k_n, \ldots k_0>$ and $l=<l_n, \ldots l_0>$, which are set so that all the bits of the scalar values k and l are represented by 0, +1, or −1, and the combination $(k_i, l_i)$ of bits at positions corresponding to the scalar values k and l is set to satisfy $(k_i, l_i) = (0, \pm 1)$ or $(\pm 1, 0)$. The computation execution section 102 shown in FIG. 1 performs a scalar multiplication of $kP+lQ$ or $kD_1+lD_2$ with the joint regular form of $(k, l)$ generated by the scalar value controller 101.

Furthermore, when both the scalar values k and l are even or odd, the scalar value controller 101 is configured to change the scalar values so as to be set to a combination of an even number and an odd number, and perform a process for generating joint regular form of $(k, l)$ ti $k=<k_n, \ldots k_0>$ and $l=<l_n, \ldots l_0>$ in which, with regard to the changed scalar values k and l, the combination $(k_i, l_i)$ of bits at positions corresponding to the changed scalar values k and l satisfies $(k_i, l_i)=(0, \pm1)$ or $(\pm1, 0)$. The computation execution section 102 is configured to perform a scalar multiplication of $kP+lQ$ or $kD_1+lD_2$ on the basis of the changed scalar values, perform a correction computation, and compute scalar double-and-add results by applying the scalar values before being changed.

Furthermore, the computation execution section 102 is configured to perform computation to which a simultaneous computation technique of selecting the corresponding bit $(k_i, l_i)$ of the JRF representation scalar values $k=<k_n, \ldots k_0>$ and $l=<l_n, \ldots l_0>$, and simultaneously computing the scalar multiplication of $kP+lQ$ or $kD_1+lD_2$ is applied. The computation execution section 102 performs a computation process in which the same computation sequence is used for all the corresponding bits $(k_i, l_i)$ of the JRF representation scalar values $k=<k_n, \ldots k_0>$ and $l=<l_n, \ldots l_0>$, and performs the scalar multiplication of $kP+lQ$ or $kD_1+lD_2$ without computing an addition point $P+Q$ or an addition divisor $D_1+D_2$ in computation processing.

As a result of the above processing, high-speed computation is realized, and secure encryption processing having high resistance against SPA becomes possible.

(3) Example of the Configuration of the Encryption Processing Apparatus

Figure 7:
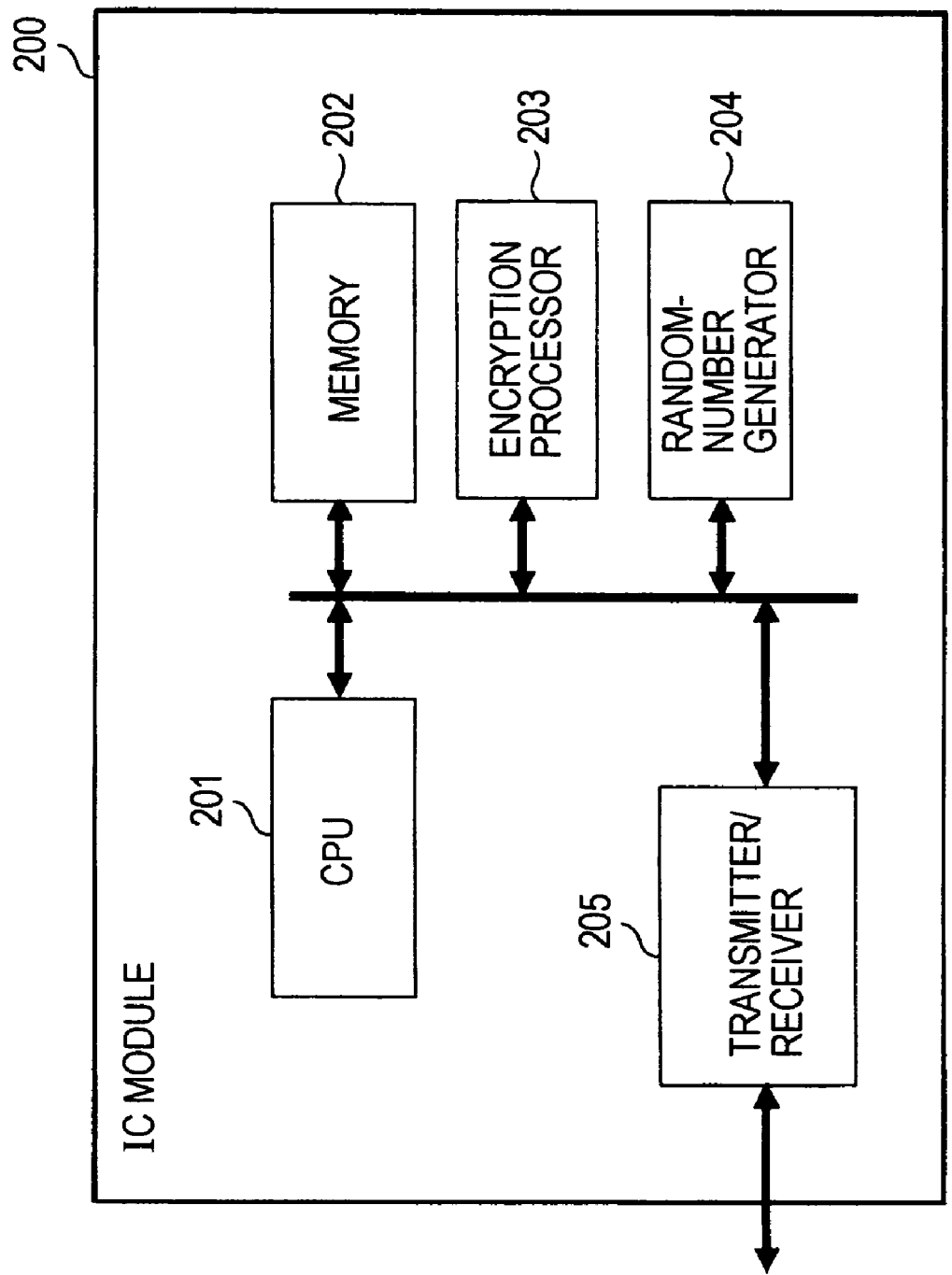
FIG. 7 shows an example of the configuration of an IC module as an example of an encryption execution device for performing encryption computation according to an embodiment of the present invention.

Lastly, an example of an IC module 200 serving as a device that performs the above-described encryption process is shown in FIG. 7. The above-described processing can be performed by, for example, a PC, an IC card, a reader/writer, and other various encryption processing apparatuses. The IC module 200 shown in FIG. 7 can be configured as one of these various apparatuses.

A CPU (Central processing Unit) 201 shown in FIG. 7 is a processor for performing various kinds of programs, such as starting and ending of encryption processing, control of data transmission and reception, data transfer control between component sections, and others. A memory 202 is formed of a ROM (Read-Only-Memory) for storing programs to be executed by the CPU or fixed data as computation parameters, a RAM (Random Access Memory) used as an area for storing programs executed by the CPU 201, and parameters and flags that change as appropriate in program processing and used as a work area, and the like.

Examples of a computation execution program to be stored in the memory 202 include a program including a computation sequence of the above-described scalar point double-and-add process. The data storage area is preferably formed as a memory having anti-tampering structure.

An encryption processor 203 performs encryption processing, decoding processing, and the like including the above-described scalar multiplication process. Here, an example in which encryption processing means is formed as individual modules has been described. Alternatively, the configuration may be formed in such a manner that such independent encryption processing modules are not provided, and the CPU 201 may read an encryption processing program, which is stored in a ROM, and execute the encryption processing program.

A random-number generator 204 performs a process for generating a random number that is necessary to generate a key necessary for encryption processing.

A transmitter-receiver 205 is a data communication processor for performing data communication with the outside, which performs data communication with an IC module such as a reader-writer, outputs encrypted text generated in the IC module, inputs data from a device such as an external reader-writer.

In the foregoing, the present invention has been described in detail while referring to specific embodiments. However, it is self-explanatory that a person skilled in the art can make modifications and alterations of the embodiments within the scope and spirit of the present invention. That is, the present invention has been described in the form of examples and should not be construed as being limited. To determine the gist of the present invention, the claims should be taken into consideration.

The series of processes described in the specification can be performed by hardware, software, or the combined configuration of them. When the series of processes is to be performed by software, a program in which a processing sequence is recorded is installed in a memory of a computer that is incorporated in specialized hardware, whereby the program is executed, or a program is installed into a general-purpose computer capable of performing various processes, whereby the program is executed.

For example, a program can be recorded in advance in a hard disk and a ROM (Read Only Memory) serving as recording media. Alternatively, a program can be temporarily or permanently stored (recorded) on a removable recording medium, such as a flexible disk, a CD-ROM (Compact Disc Read Only Memory), an MO (Magneto optical) disc, a DVD (Digital Versatile Disc), a magnetic disk, or a semiconductor memory. Such a removable recording medium can be provided as packaged software.

In addition to being installed into a computer from the above-described removable recording medium, the program may be transferred wirelessly from a download site or may be transferred by wire to the computer via a network, such as a LAN (Local Area Network) or the Internet. It is possible for the computer to receive the program that is transferred in such a manner and to install the program into a recording medium such as a hard disk contained therein.

The various processes described in the specification may be executed not only in chronological order according to the description, and may also be executed in parallel or individually according to the processing performance of the apparatus that performs processing or as necessary. In this specification, the system designates a logical assembly of a plurality of devices. It is not essential that the devices be disposed in the same housing.

It should be understood by those skilled in the art that various modifications, combinations, sub-combinations and alterations may occur depending on design requirements and other factors insofar as they are within the scope of the appended claims or the equivalents thereof.

The invention claimed is:

1. An encryption processing apparatus for performing one of a scalar multiplication of $kP+lQ$ based on two points P and Q on an elliptic curve defined by elliptic curve cryptography and scalar values k and l, and a scalar multiplication of $kD1+lD2$ based on divisors D1 and D2 defined by hyperelliptic curve cryptography and scalar values k and l, the encryption processing apparatus comprising:

an encryption processor including
a scalar value controller configured to generate joint regular form of (k, l)
k=<kn, . . . k0> and l=<ln, . . . l0>, which are set so that all the bits of the scalar values k and l are represented by 0, +1, or −1, and the combination (ki, li) of bits at positions corresponding to the scalar values k and l is set to satisfy (ki, li)=(0, ±1) or (±1, 0); and
a computation execution section configured to perform a scalar multiplication of kP+lQ or kD1+lD2 with the joint regular form of (k, l) generated by the scalar value controller,
wherein, it is determined whether or not both the scalar values k and l are even or odd, and when both the scalar values k and l are even or odd, the scalar value controller changes one of the scalar values so as to be set to a combination of an even number and an odd number, and generates joint regular form of (k, l) k=<kn, . . . k0> and l=<ln, . . . l0>
in which the combination (ki, li) of bits at positions corresponding to the changed scalar values k and l satisfies (ki, li)=(0, ±1) or (±1, 0), and
the computation execution section performs a scalar multiplication of kP+lQ or kD1+lD2 on the basis of the changed scalar values, performs a correction computation, and computes scalar double-and-add results by applying the scalar values before being changed.

2. The encryption processing apparatus according to claim 1, wherein the computation execution section selects corresponding bits (ki, li) of the joint regular form of (k, l) k=<kn, . . . k0> and l=<ln, . . . l0>, and performs a computation process to which a simultaneous computation technique of simultaneously computing a scalar multiplication of kP+lQ or kD1+lD2 is applied.

3. The encryption processing apparatus according to claim 2, wherein the computation execution section performs a computation process to which the same computation sequence is applied on all the corresponding bits of the joint regular form of (k, l)
(ki, li) of k=<kn, . . . k0> and l=<ln, . . . l0>.

4. The encryption processing apparatus according to claim 2, wherein, in the computation process, the computation execution section performs a scalar multiplication of kP+lQ or kD1+lD2 without computing an addition point of P+Q or an addition divisor of D1+D2.

5. An encryption processing method for use with an encryption processing apparatus for performing one of a scalar multiplication of kP+lQ based on two points P and Q on an elliptic curve defined by elliptic curve cryptography and scalar values k and l, and a scalar multiplication of kD1+lD2 based on divisors D1 and D2 defined by hyperelliptic curve cryptography and scalar values k and l, the encryption processing method comprising:

using an encryption processor for
generating joint regular form of (k, l)
k=<kn, . . . k0> and l=<ln, . . . l0>, which are set so that all the bits of the scalar values k and l are represented by 0, +1, or −1, and the combination (ki, li) of bits at positions corresponding to the scalar values k and l is set to satisfy (ki, li)=(0, ±1) or (±1, 0); and
performing a computation process of a scalar multiplication of kP+lQ or kD1+lD2 with the joint regular form of (k, l) generated in the scalar value control,
wherein, it is determined whether or not both the scalar values k and l are even or odd, and when both the scalar values k and l are even or odd, in the scalar value control, one of the scalar values is changed to be set to a combination of an even number and an odd number, joint regular form of (k, l)
k=<kn, . . . k0> and l=<ln, . . . l0> are generated
in which the combination (ki, li) of bits at positions corresponding to the changed scalar values k and l satisfies (ki, li)=(0, ±1) or (±1, 0), and
in the computation execution, a computation process of a scalar multiplication of kP+lQ or kD1+lD2 is performed on the basis of the changed scalar values, a correction computation is performed, and scalar double-and-add results are computed by applying the scalar values before being changed.

6. The encryption processing method according to claim 5, wherein, in the computation execution, corresponding bits (ki, li) of the joint regular form of (k, l)
k=<kn, . . . k0> and l=<ln, . . . l0> are selected, and a computation process to which a simultaneous computation technique of simultaneously computing a scalar multiplication of kP+lQ or kD1+lD2 is applied is performed.

7. The encryption processing method according to claim 6, wherein, in the computation execution, a computation process to which the same computation sequence is applied is performed on all the corresponding bits (ki, li) of the joint regular form of (k, l)
k=<kn, . . . k0> and l=<ln, . . . l0>.

8. The encryption processing method according to claim 6, wherein, in the computation process, a scalar multiplication of kP+lQ or kD1+lD2 is performed without computing an addition point of P+Q or an addition divisor of D1+D2.

9. A non-transitory computer-readable medium storing a computer-readable program for enabling an encryption processing apparatus to perform one of a scalar multiplication of kP+lQ based on two points P and Q on an elliptic curve defined by elliptic curve cryptography and scalar values k and l, and a scalar multiplication of kD1+lD2 based on divisors D1 and D2 defined by hyperelliptic curve cryptography and scalar values k and l, the computer program comprising:

generating joint regular form of (k, l)
k=<kn, . . . k0> and l=<ln, . . . l0>, which are set so that all the bits of the scalar values k and l are represented by 0, +1, or −1, and the combination (ki, li) of bits at positions corresponding to the scalar values k and l is set to satisfy (ki, li)=(0, ±1) or (±1, 0); and
performing a computation process of a scalar multiplication of kP+lQ or kD1+lD2 with the joint regular form of (k, l) generated in the scalar value control,
wherein, it is determined whether or not both the scalar values k and l are even or odd, and when both the scalar values k and l are even or odd, in the scalar value control, one of the scalar values is changed to be set to a combination of an even number and an odd number, joint regular form of (k, l)
k=<kn, . . . k0> and l=<ln, . . . l0> are generated
in which the combination (ki, li) of bits at positions corresponding to the changed scalar values k and l satisfies (ki, li)=(0, ±1) or (±1, 0), and
in the computation execution, a computation process of a scalar multiplication of kP+lQ or kD1+lD2 is performed on the basis of the changed scalar values, a correction computation is performed, and scalar double-and-add results are computed by applying the scalar values before being changed.

* * * * *